(12) United States Patent
Li

(10) Patent No.: US 11,889,473 B2
(45) Date of Patent: Jan. 30, 2024

(54) RESOURCE SWITCHING METHOD, AND RESOURCE ALLOCATION METHOD, APPARATUS, DEVICE AND SYSTEM

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 357 days.

(21) Appl. No.: 17/285,996

(22) PCT Filed: Oct. 19, 2018

(86) PCT No.: PCT/CN2018/111103
§ 371 (c)(1),
(2) Date: Apr. 16, 2021

(87) PCT Pub. No.: WO2020/077644
PCT Pub. Date: Apr. 23, 2020

(65) Prior Publication Data
US 2021/0377913 A1  Dec. 2, 2021

(51) Int. Cl.
*H04W 72/02* (2009.01)
*H04L 27/26* (2006.01)
*H04W 72/044* (2023.01)

(52) U.S. Cl.
CPC ......... *H04W 72/02* (2013.01); *H04L 27/2607* (2013.01); *H04L 27/26025* (2021.01); *H04W 72/044* (2013.01)

(58) Field of Classification Search
CPC ... H04W 72/02; H04W 72/044; H04W 36/06; H04W 72/0453; H04W 72/23;
(Continued)

(56) References Cited

U.S. PATENT DOCUMENTS

2016/0295345 A1   10/2016  Oh
2018/0183551 A1*  6/2018   Chou ............... H04L 5/0042
(Continued)

FOREIGN PATENT DOCUMENTS

CN   103298118 A   9/2013
CN   107750439 A   3/2018
(Continued)

OTHER PUBLICATIONS

First Office Action of the Chinese application No. 201880001733.3, dated Sep. 30, 2022, 17 pgs.
(Continued)

*Primary Examiner* — Rina C Pancholi
(74) *Attorney, Agent, or Firm* — Cooper Legal Group, LLC

(57) ABSTRACT

The present disclosure relates to the technical field of communications, and disclosed thereby are a resource switching method and a resource allocation method, apparatus, device and system. The method comprises: when a terminal determines that a first BWP currently used needs to be switched, the terminal selects a second BWP among at least two BWPs configured in advance; and the terminal switches from the first BWP to the second BWP. By means of the present disclosure, a terminal may autonomously configure and switch BWPs without needing an access network device to specify the BWP for the terminal, and the BWP may be introduced into a communication system supporting large bandwidth such as D2D, thus reducing the power consumption of the terminal within the communication system, and ensuring that the communication of the terminal is effective by switching the BWP in time.

17 Claims, 21 Drawing Sheets

(58) Field of Classification Search
CPC ............. H04W 72/53; H04L 27/26025; H04L 27/2607; H04L 5/0064; H04L 5/0044
See application file for complete search history.

(56) References Cited

U.S. PATENT DOCUMENTS

| | | | |
|---|---|---|---|
| 2018/0242319 A1 | 8/2018 | Akkarakaran | |
| 2018/0279289 A1* | 9/2018 | Islam | H04W 72/0446 |
| 2018/0288746 A1* | 10/2018 | Zhang | H04L 1/0031 |
| 2021/0204288 A1* | 7/2021 | Ji | H04W 72/23 |

FOREIGN PATENT DOCUMENTS

| | | | |
|---|---|---|---|
| CN | 107911203 A | 4/2018 | |
| CN | 108260214 A | 7/2018 | |
| CN | 108370573 A | 8/2018 | |
| CN | 108633059 A | 10/2018 | |
| WO | 2018066923 A1 | 4/2018 | |
| WO | 2018121621 A1 | 7/2018 | |
| WO | 2018177223 A1 | 10/2018 | |
| WO | 2018184435 A1 | 10/2018 | |

OTHER PUBLICATIONS

International Search Report in the international application No. PCT/CN2018/111103, dated Mar. 29, 2019, 3 pgs.
English translation of the Written Opinion of the International Search Authority in the international application No. PCT/CN2018/111103, dated Mar. 29, 2019, 5 pgs.
"Bandwidth Adaptation via BWP Selection in NR", Jun. 2017, 3GPP TSG RAN WG1 NR Ad-Hoc #2, R1-1710878, Source: InterDigital, Inc. 3 pages.
"Summary of Bandwidth Part Remaining Issues", Oct. 2018, 3GPP TSG RAN WG1 Meeting #94bis, R1-1811850, Source: MediaTek Inc., 25 pages.
"Issues on BWP Switch and Search Space Configuration for BFR", Jul. 2018, 3GPP TSG-RAN WG2 Adhoc1807, R2-1810641, Source: Huawei, HiSilicon, 4 pages.
"UE Autonomous BWP Switching for Configured UL Resources", Feb. 2018, 3GPP TSG-RAN WG2 RAN2#101 R2-1802438(Resubmission of R2-1801243), Source: LG Electronics Inc., 3 pages.
"5G NR R15 R&S Signal Generation and Analysis Program", Oct. 2018, Tang Song, Information and Communications Technology and Policy, No. 10, 5 pages with English abstract.

* cited by examiner

RESOURCE SWITCHING METHOD, AND RESOURCE ALLOCATION METHOD, APPARATUS, DEVICE AND SYSTEM

TECHNICAL FIELD

The disclosure relates to the technical field of communications, in particular to a method for resource switching, a method for resource configuration, an apparatus, a device and a system.

BACKGROUND

In $5^{th}$ Generation (5G, the fifth generation of mobile communication technology), a minimum bandwidth is 5 MHz, and a maximum bandwidth is 400 MHz. If it is required that all terminals support a bandwidth of 400 MHz and if a sampling rate corresponding to the bandwidth of 400 MHz is used for sampling, a power consumption of the terminal will be relatively high since a size of the bandwidth is positively correlated with the sampling rate.

Since the terminal may not fully occupy the bandwidth of 400 MHz at one time, in order to save the power consumption of the terminal, a bandwidth part (BWP) may be allocated for the terminal by an access network device. A bandwidth allocated for the terminal by the access network device may be changed dynamically. For example, a larger bandwidth may be allocated to the terminal when a traffic volume of the terminal is large, and a smaller bandwidth may be allocated to the terminal when the traffic volume of the terminal is small.

Communication systems such as a D2D (Device to Device) communication system may also support a large bandwidth. However, a BWP has not yet been introduced into these communication systems at present.

SUMMARY

To solve the problem in the related technologies, the disclosure provides a method for resource switching, a method for resource configuration, an apparatus, a device and a system.

According to a first aspect of embodiments of the disclosure, there is provided a method for resource switching, and the method includes the following operations.

Responsive to determining that it is necessary to switch a first bandwidth part (BWP) presently used, a terminal selects a second BWP among at least two pre-configured BWPs.

The terminal switches from the first BWP to the second BWP.

In a possible implementation, the method may further include the following operations.

The terminal obtains present communication status information.

Responsive to the communication status information not matching the first BWP presently used by the terminal, the terminal determines that it is necessary to switch the first BWP presently used.

In a possible implementation, the operation that the terminal selects the second BWP among the at least two pre-configured BWPs may include the following actions.

The terminal determines configuration information of a BWP to be switched to based on the communication status information. The configuration information includes at least one of: a bandwidth, a subcarrier spacing, a type of a cyclic prefix (CP) or a pilot configuration.

The terminal searches for a BWP matching the configuration information among the at least two pre-configured BWPs, and determines the BWP as the second BWP.

In a possible implementation, the method may further include the following operations.

The terminal detects an available time-frequency resource on the first BWP.

Responsive to there being no available time-frequency resource on the first BWP, the terminal determines that it is necessary to switch the first BWP presently used.

In a possible implementation, the method may further include the following operations.

After the terminal switches from the first BWP to the second BWP, the terminal detects an available time-frequency resource on the second BWP to acquire the available time-frequency resource.

The terminal performs data transmission on the available time-frequency resource.

In a possible implementation, the method may further include the following operations.

Before the terminal selects the second BWP, the terminal detects an available time-frequency resource on each of pre-stored BWPs to acquire the available time-frequency resource in the BWP. The pre-stored BWPs include the second BWP.

After the terminal switches from the first BWP to the second BWP, the terminal performs data transmission on the available time-frequency resource in the second BWP.

In a possible implementation, the method may further include the following operations.

Before the terminal selects the second BWP, the terminal detects an available time-frequency resource on each of pre-stored BWPs to acquire the available time-frequency resource in the BWP. The pre-stored BWPs include the second BWP.

After the terminal switches from the first BWP to the second BWP, the terminal detects an available time-frequency resource on the second BWP again to acquire the available time-frequency resource.

The terminal performs data transmission on the available time-frequency resource acquired again.

In a possible implementation, the method may further include the following operations.

The terminal obtains at least one pre-configured BWP set.

The terminal selects a BWP set from the at least one BWP set. The BWP set includes at least two BWPs.

The terminal selects the first BWP from the selected BWP set.

In a possible implementation, the operation that the terminal obtains the at least one pre-configured BWP set may include the following action.

The terminal receives the at least one BWP set broadcast by an access network device. The terminal is located within a coverage of the access network device.

In a possible implementation, the operation that the terminal obtains the at least one pre-configured BWP set may include the following action.

Responsive to there being at least one BWP set pre-stored in the terminal, the terminal reads the at least one pre-stored BWP set.

In a possible implementation, the operation that the terminal selects the BWP set from the at least one BWP set may include the following actions.

The terminal receives configuration indication from the access network device. The configuration indication indicates a BWP set in the at least one BWP set, and the terminal is located within the coverage of the access network device.

The terminal selects the BWP set indicated by the configuration indication.

In a possible implementation, the operation that the terminal selects the BWP set from the at least one BWP set may include the following action.

The terminal obtains a selection rule and selects the BWP set from the at least one BWP set according to the selection rule.

In a possible implementation, the operation that the terminal selects the first BWP from the selected BWP set may include the following actions.

The terminal obtains present communication status information.

The terminal determines configuration information of a BWP to be selected based on the communication status information. The configuration information includes at least one of: a bandwidth, a subcarrier spacing, a type of a CP or a pilot configuration.

The terminal searches for a BWP matching the configuration information from the BWP set, and determines the BWP as the first BWP.

According to a second aspect of the embodiments of the disclosure, there is provided a method for resource configuration, and the method includes the following operations.

A terminal obtains at least one pre-configured BWP set. Each of the at least one BWP set includes at least one BWP.

The terminal selects a BWP set from the at least one BWP set.

The terminal selects a first BWP from the selected BWP set.

In a possible implementation, the operation that the terminal obtains the at least one pre-configured BWP set may include the following action.

The terminal receives the at least one BWP set broadcast by an access network device. The terminal is located within a coverage of the access network device.

In a possible implementation, the operation that the terminal obtains the at least one pre-configured BWP set may include the following action.

Responsive to there being at least one BWP set pre-stored in the terminal, the terminal reads the at least one pre-stored BWP set.

In a possible implementation, the operation that the terminal selects the BWP set from the at least one BWP set may include the following actions.

The terminal receives configuration indication from the access network device. The configuration indication indicates a BWP set in the at least one BWP set, and the terminal is located within the coverage of the access network device.

The terminal selects the BWP set indicated by the configuration indication.

In a possible implementation, the operation that the terminal selects the BWP set from the at least one BWP set may include the following action.

The terminal obtains a selection rule and selects the BWP set from the at least one BWP set according to the selection rule.

In a possible implementation, the operation that the terminal selects the first BWP from the selected BWP set may include the following actions.

The terminal obtains present communication status information.

The terminal determines configuration information of a BWP to be selected based on the communication status information. The configuration information includes at least one of: a bandwidth, a subcarrier spacing, a type of a CP or a pilot configuration.

The terminal searches for a BWP matching the configuration information from the BWP set, and determines the BWP as the first BWP.

In a possible implementation, the method may further include the following operations.

When the BWP set selected by the terminal includes at least two BWPs, and it is determined that it is necessary to switch the first BWP presently used, the terminal selects a second BWP from the BWP set.

The terminal switches from the first BWP to the second BWP.

In a possible implementation, the method may further include the following operations.

The terminal obtains present communication status information.

Responsive to the communication status information not matching the first BWP presently used by the terminal, the terminal determines that it is necessary to switch the first BWP presently used.

In a possible implementation, the operation that the terminal selects the second BWP from the BWP set may include the following actions.

The terminal determines configuration information of a BWP to be switched to based on the communication status information. The configuration information includes at least one of: a bandwidth, a subcarrier spacing, a type of a CP or a pilot configuration.

The terminal searches for a BWP matching the configuration information from the BWP set, and determines the BWP as the second BWP.

In a possible implementation, the method may further include the following operations.

The terminal detects an available time-frequency resource on the first BWP.

Responsive to there being no available time-frequency resource on the first BWP, the terminal determines that it is necessary to switch the first BWP presently used.

In a possible implementation, the method may further include the following operations.

After the terminal switches from the first BWP to the second BWP, the terminal detects an available time-frequency resource on the second BWP to acquire the available time-frequency resource.

The terminal performs data transmission on the available time-frequency resource.

In a possible implementation, the method may further include the following operations.

Before the terminal selects the second BWP, the terminal detects an available time-frequency resource on each of pre-stored BWPs to acquire the available time-frequency resource in the BWP. The pre-stored BWPs include the second BWP.

After the terminal switches from the first BWP to the second BWP, the terminal performs data transmission on the available time-frequency resource in the second BWP.

In a possible implementation, the method may further include the following operations.

Before the terminal selects the second BWP, the terminal detects an available time-frequency resource on each of pre-stored BWPs to acquire the available time-frequency resource in the BWP. The pre-stored BWPs include the second BWP.

After the terminal switches from the first BWP to the second BWP, the terminal detects an available time-frequency resource on the second BWP again to acquire the available time-frequency resource.

The terminal performs data transmission on the available time-frequency resource acquired again.

According to a third aspect of the embodiments of the disclosure, there is provided a method for resource configuration, and the method includes the following operations.

An access network device obtains at least one BWP set configured for a terminal. Each of the at least one BWP set includes at least one BWP, and the terminal is located within a coverage of the access network device.

The access network device broadcasts the at least one BWP set to the terminal, to enable the terminal to select a BWP set from the at least one BWP set and to select a first BWP from the selected BWP set.

In a possible implementation, the method may further include the following operations.

The access network device selects a BWP set from the at least one BWP set.

The access network device sends configuration indication to the terminal. The configuration indication indicates the BWP set in the at least one BWP set.

According to a fourth aspect of the embodiments of the disclosure, there is provided a method for resource configuration, and the method includes the following operations.

An access network device selects a BWP set from at least one BWP set configured for a terminal. Each of the at least one BWP set includes at least one BWP, and the terminal is located within a coverage of the access network device.

The access network device sends configuration indication to the terminal. The configuration indication indicates the BWP set in the at least one BWP set, to enable the terminal to select a first BWP from the BWP set.

According to a fifth aspect of the embodiments of the disclosure, there is provided an apparatus for resource switching. The apparatus includes a first selection module and a switching module.

The first selection module is configured to, responsive to a terminal determining that it is necessary to switch a first BWP presently used, select a second BWP among at least two pre-configured BWPs.

The switching module is configured to switch from the first BWP to the second BWP selected by the first selection module.

In a possible implementation, the apparatus may further include a first obtaining module and a first determination module.

The first obtaining module is configured to obtain present communication status information.

The first determination module is configured to, responsive to the communication status information not matching the first BWP presently used by the terminal, determine that it is necessary to switch the first BWP presently used.

In a possible implementation, the first selection module may be further configured to: determine configuration information of a BWP to be switched to based on the communication status information, the configuration information including at least one of: a bandwidth, a subcarrier spacing, a type of a CP or a pilot configuration; and search for a BWP matching the configuration information among the at least two pre-configured BWPs, and determine the BWP as the second BWP.

In a possible implementation, the apparatus may further include a first detection module and a second determination module.

The first detection module is configured to detect an available time-frequency resource on the first BWP.

The second determination module is configured to, responsive to there being no available time-frequency resource on the first BWP, determine that it is necessary to switch the first BWP presently used.

In a possible implementation, the apparatus may further include a second detection module and a first transmission module.

The second detection module is configured to, after the terminal switches from the first BWP to the second BWP, detect an available time-frequency resource on the second BWP to acquire the available time-frequency resource.

The first transmission module is configured to perform data transmission on the available time-frequency resource acquired by the second detection module.

In a possible implementation, the apparatus may further include a third detection module and a second transmission module.

The third detection module is configured to, before the terminal selects the second BWP, detect an available time-frequency resource on each of pre-stored BWPs to acquire the available time-frequency resource in the BWP. The pre-stored BWPs include the second BWP.

The second transmission module is configured to, after the terminal switches from the first BWP to the second BWP, perform data transmission on the available time-frequency resource in the second BWP acquired by the third detection module.

In a possible implementation, the apparatus may further include a fourth detection module, a fifth detection module and a third transmission module.

The fourth detection module is configured to, before the terminal selects the second BWP, detect an available time-frequency resource on each of pre-stored BWPs to acquire the available time-frequency resource in the BWP. The pre-stored BWPs include the second BWP.

The fifth detection module is configured to, after the terminal switches from the first BWP to the second BWP, detect an available time-frequency resource on the second BWP again to acquire the available time-frequency resource.

The third transmission module is configured to perform data transmission on the available time-frequency resource acquired again by the fifth detection module.

In a possible implementation, the apparatus may further include a second obtaining module and a second selection module.

The second obtaining module is configured to obtain at least one pre-configured BWP set.

The second selection module is configured to select a BWP set from the at least one BWP set obtained by the second obtaining module, the BWP set including at least two BWPs, and select the first BWP from the selected BWP set.

In a possible implementation, the second obtaining module may be further configured to receive the at least one BWP set broadcast by an access network device. The terminal is located within a coverage of the access network device.

In a possible implementation, the second obtaining module may be further configured to, responsive to there being at least one BWP set pre-stored in the terminal, read the at least one pre-stored BWP set.

In a possible implementation, the second selection module may be further configured to: receive configuration indication from the access network device, the configuration indication indicating a BWP set in the at least one BWP set and the terminal being located within the coverage of the access network device; and select the BWP set indicated by the configuration indication.

In a possible implementation, the second selection module may be further configured to obtain a selection rule, and select the BWP set from the at least one BWP set according to the selection rule.

In a possible implementation, the second selection module may be further configured to: obtain present communication status information; determine configuration information of a BWP to be selected based on the communication status information, the configuration information including at least one of: a bandwidth, a subcarrier spacing, a type of a CP or a pilot configuration; and search for a BWP matching the configuration information from the BWP set, and determine the BWP as the first BWP.

According to a sixth aspect of the embodiments of the disclosure, there is provided an apparatus for resource configuration. The apparatus includes a first obtaining module and a first selection module.

The first obtaining module is configured to obtain at least one pre-configured BWP set. Each of the at least one BWP set includes at least one BWP.

The first selection module is configured to select a BWP set from the at least one BWP set obtained by the first obtaining module, and select a first BWP from the selected BWP set.

In a possible implementation, the first obtaining module may be further configured to receive the at least one BWP set broadcast by an access network device. A terminal is located within a coverage of the access network device.

In a possible implementation, the first obtaining module may be further configured to, responsive to there being at least one BWP set pre-stored in a terminal, read the at least one pre-stored BWP set.

In a possible implementation, the first selection module may be further configured to: receive configuration indication from the access network device, the configuration indication indicating a BWP set in the at least one BWP set and the terminal being located within the coverage of the access network device; and select the BWP set indicated by the configuration indication.

In a possible implementation, the first selection module may be further configured to obtain a selection rule, and select the BWP set from the at least one BWP set according to the selection rule.

In a possible implementation, the first selection module may be further configured to: obtain present communication status information; determine configuration information of a BWP to be selected based on the communication status information, the configuration information including at least one of: a bandwidth, a subcarrier spacing, a type of a CP or a pilot configuration; and search for a BWP matching the configuration information from the BWP set, and determine the BWP as the first BWP.

In a possible implementation, the apparatus may further include a second selection module and a switching module.

The second selection module is configured to, when the BWP set selected by the terminal includes at least two BWPs, and it is determined that it is necessary to switch the first BWP presently used, select a second BWP from the BWP set.

The switching module is configured to switch from the first BWP to the second BWP selected by the second selection module.

In a possible implementation, the apparatus may further include a second obtaining module and a first determination module.

The second obtaining module is configured to obtain present communication status information.

The first determination module is configured to, responsive to the communication status information not matching the first BWP presently used by the terminal, determine that it is necessary to switch the first BWP presently used.

In a possible implementation, the second selection module may be further configured to: determine configuration information of a BWP to be switched to based on the communication status information, the configuration information including at least one of: a bandwidth, a subcarrier spacing, a type of a CP or a pilot configuration; and search for a BWP matching the configuration information from the BWP set, and determine the BWP as the second BWP.

In a possible implementation, the apparatus may further include a first detection module and a second determination module.

The first detection module is configured to detect an available time-frequency resource on the first BWP.

The second determination module is configured to, responsive to there being no available time-frequency resource on the first BWP, determine that it is necessary to switch the first BWP presently used.

In a possible implementation, the apparatus may further include a second detection module and a first transmission module.

The second detection module is configured to, after the terminal switches from the first BWP to the second BWP, detect an available time-frequency resource on the second BWP to acquire the available time-frequency resource.

The first transmission module is configured to perform data transmission on the available time-frequency resource acquired by the second detection module.

In a possible implementation, the apparatus may further include a third detection module and a second transmission module.

The third detection module is configured to, before the terminal selects the second BWP, detect an available time-frequency resource on each of pre-stored BWPs to acquire the available time-frequency resource in the BWP. The pre-stored BWPs include the second BWP.

The second transmission module is configured to, after the terminal switches from the first BWP to the second BWP, perform data transmission on the available time-frequency resource in the second BWP acquired by the third detection module.

In a possible implementation, the apparatus may further include a fourth detection module, a fifth detection module and a third transmission module.

The fourth detection module is configured to, before the terminal selects the second BWP, detect an available time-frequency resource on each of pre-stored BWPs to acquire the available time-frequency resource in the BWP. The pre-stored BWPs include the second BWP.

The fifth detection module is configured to, after the terminal switches from the first BWP to the second BWP, detect an available time-frequency resource on the second BWP again to acquire the available time-frequency resource.

The third transmission module is configured to perform data transmission on the available time-frequency resource acquired again by the fifth detection module.

According to a seventh aspect of the embodiments of the disclosure, there is provided an apparatus for resource configuration. The apparatus includes an obtaining module and a broadcasting module.

The obtaining module is configured to obtain at least one BWP set configured for a terminal. Each of the at least one BWP set includes at least one BWP, and the terminal is located within a coverage of an access network device.

The broadcasting module is configured to broadcast the at least one BWP set obtained by the obtaining module to the terminal, to enable the terminal to select a BWP set from the at least one BWP set and to select a first BWP from the selected BWP set.

In a possible implementation, the apparatus may further include a selection module and an indication module.

The selection module is configured to select a BWP set from the at least one BWP set.

The indication module is configured to send configuration indication to the terminal. The configuration indication indicates the BWP set in the at least one BWP set.

According to an eighth aspect of the embodiments of the disclosure, there is provided an apparatus for resource configuration. The apparatus includes a selection module and a sending module.

The selection module is configured to select a BWP set from at least one BWP set configured for a terminal. Each of the at least one BWP set includes at least one BWP, and the terminal is located within a coverage of an access network device.

The sending module is configured to send configuration indication to the terminal. The configuration indication indicates the BWP set in the at least one BWP set, to enable the terminal to select a first BWP from the BWP set.

According to a ninth aspect of the embodiments of the disclosure, there is provided a terminal, including:
a processor; and
a memory for storing instructions executable by the processor.
Herein, the processor is configured to:
responsive to a terminal determining that it is necessary to switch a first BWP presently used, select a second BWP among at least two pre-configured BWPs; and
switch from the first BWP to the second BWP.

According to a tenth aspect of the embodiments of the disclosure, there is provided a terminal, including:
a processor; and
a memory for storing instructions executable by the processor.
Herein, the processor is configured to:
obtain at least one pre-configured BWP set, each of the at least one BWP set including at least one BWP;
select a BWP set from the at least one BWP set; and
select a first BWP from the selected BWP set.

According to an eleventh aspect of the embodiments of the disclosure, there is provided an access network device, including:
a processor and
a memory for storing instructions executable by the processor.
Herein, the processor is configured to:
obtain at least one BWP set configured for a terminal, each of the at least one BWP set including at least one BWP, and the terminal being located within a coverage of the access network device; and
broadcast the at least one BWP set to the terminal, to enable the terminal to select a BWP set from the at least one BWP set and to select a first BWP from the selected BWP set.

According to a twelfth aspect of the embodiments of the disclosure, there is provided an access network device, including:
a processor and
a memory for storing instructions executable by the processor.

Herein, the processor is configured to:
select a BWP set from at least one BWP set configured for a terminal, each of the at least one BWP set including at least one BWP, and the terminal being located within a coverage of the access network device; and
send configuration indication to the terminal, the configuration indication indicating the BWP set in the at least one BWP set, to enable the terminal to select a first BWP from the BWP set.

According to a thirteenth aspect of the embodiments of the disclosure, there is provided a communication system, including the apparatus for resource configuration according to the sixth aspect and the apparatus for resource configuration according to the seventh aspect; or, including the apparatus for resource configuration according to the sixth aspect and the apparatus for resource configuration according to the eighth aspect; or, including the terminal according to the tenth aspect and the access network device according to the eleventh aspect; or, including the terminal according to the tenth aspect and the access network device according to the twelfth aspect.

According to a fourteenth aspect of the embodiments of the disclosure, there is provided a computer readable storage medium having stored therein at least one instruction, at least one segment of a program, a code set or an instruction set. The at least one instruction, the at least one segment of the program, the code set or the instruction set is loaded and executed by a processor to execute one of the following methods: the method for resource switching according to the first aspect; the method for resource configuration according to the second aspect; the method for resource configuration according to the third aspect; or the method for resource configuration according to the fourth aspect.

Solutions provided by the embodiments of the disclosure may provide the following beneficial effects.

The terminal selects a BWP set from at least one pre-configure BWP set, and selects a BWP from the BWP set. In this way, the terminal may select the BWP by itself, without the need for the access network device to specify the BWP for the terminal. Therefore, the BWP may be introduced into the communication systems supporting a large bandwidth such as a D2D communication system, and the power consumption of the terminal is saved in these communication systems.

When a terminal determines that it is necessary to switch a first BWP presently used, the terminal selects a second BWP among at least two pre-configured BWPs, and then the terminal switches from the first BWP to the second BWP. In this way, the terminal may switch the BWP by itself, without the need for the access network device to specify the BWP for the terminal. Therefore, not only may the BWP be introduced into the communication systems supporting the large bandwidth such as the D2D communication system, which saves the power consumption of the terminal in these communication systems, but also a quality of communication of the terminal may be ensured since the BWP may be switched timely.

It should be understood that the foregoing general description and the following detailed description are exemplary only and are not intended to limit the disclosure.

BRIEF DESCRIPTION OF THE DRAWINGS

The accompanying drawings, which are incorporated into the description and constitute a part of the description of the disclosure, illustrate embodiments of the disclosure and, together with the description, serve to explain principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with some aspects related to the disclosure as recited in the appended claims.

The embodiments are applied to communication systems such as a D2D communication system. In a possible implementation, the communication system may be based on vehicle to everything (V2X) technology, which is a new generation of information communication technology that connect vehicles to everything. Herein, V represents a vehicle, and X represents any object that interacts with the vehicle. At present, X mainly includes a vehicle, a pedestrian, traffic road-side infrastructure and a network. The following introduces modes corresponding to different Xs in V2X.

Figure 1:
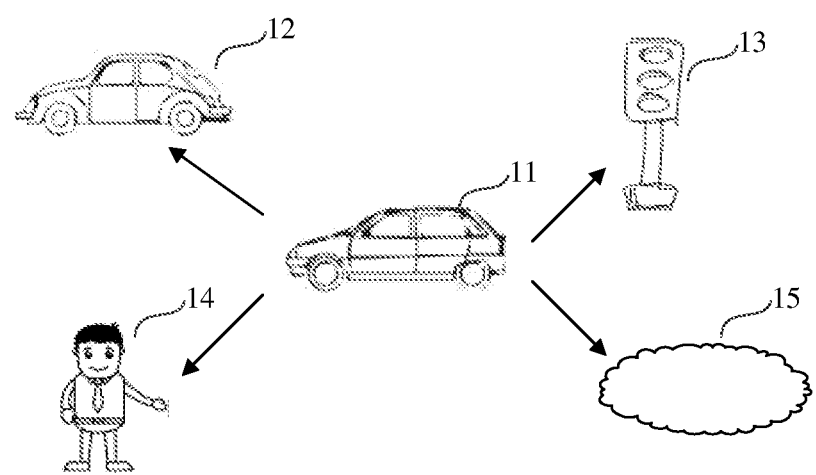
FIG. 1 is a schematic diagram of a communication system involved in various embodiments of the disclosure.

Referring to FIG. 1, a schematic diagram of a communication system provided in an exemplary embodiment of the disclosure is illustrated. The communication system includes a vehicle 11, another vehicle 12, infrastructure 13, a pedestrian 14 and a network 15.

Vehicle to vehicle (V2V) refers to the communication between the vehicle 11 and another vehicle 12. The vehicle 11 may transmit its own relevant information to another vehicle 12. The relevant information includes a driving speed, a geographic location, a driving direction, driving status and the like.

Vehicle to infrastructure (V2I) refers to the communication between the vehicle 11 and the infrastructure 13. The infrastructure 13 includes all infrastructure encountered during a driving of the vehicle 11, including a traffic light, a bus stop and a building facility such as a building and a tunnel.

Vehicle to pedestrian (V2P) refers to the communication between the vehicle 11 and the pedestrian 14. The pedestrian generally refers to an electronic device with mobile communication capability carried by the pedestrian, such as a mobile phone and a wearable device. The wearable device may include a smart bracelet, a smart watch, a smart ring and the like.

Vehicle to Network (V2N) refers to the communication between the vehicle 11 and the network 15. In a possible implementation, the vehicle 11 may communicate with the network 15 through an access network device.

Radio frequency (RF) of the V2X may support a large bandwidth. Taking into consideration the fact of saving power consumption of the terminal, a BWP may be introduced into the V2X with reference to 5G. The BWP mentioned herein may sometimes be referred to as Bandwidth Adaptation.

Figure 2:
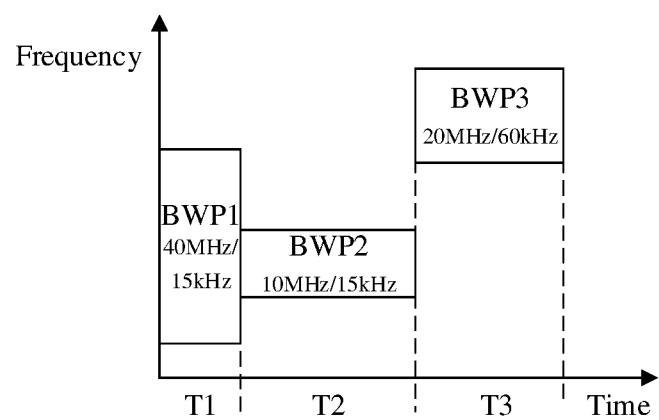
FIG. 2 is a schematic diagram of BWP switching in 5G.

At first, the BWP in 5G is introduced below. A bandwidth of the terminal in 5G may be dynamically changed. A changing process of BWP of a terminal is illustrated in FIG. 2 for easier understanding. During a first period T1, a traffic volume of the terminal is relatively large, and the access network device configures BWP1 with a larger bandwidth for the terminal (the bandwidth of which is 40 MHz and a subcarrier spacing is 15 kHz). During a second period T2, the traffic volume of the terminal is relatively small, and the access network device configures BWP2 with a smaller bandwidth for the terminal (the bandwidth of which is 10 MHz and the subcarrier spacing is 15 kHz). During a third period T3, the terminal needs to perform a specific type of service and requires a special subcarrier spacing, and the access network device configures a BWP3 for the terminal (the bandwidth of which is 20 MHz and the subcarrier spacing is 60 kHz). The terminal may use a center frequency point and sampling rate corresponding to the BWP in the respective BWP.

In 5G, the terminal may communicate with the access network device, or the terminal may communicate with other terminals through the access network device. Therefore, the terminal needs to communicate with the access network device in each condition. The communication with the terminal may be controlled by the access network device. For example, the access network device may specify a BWP for the terminal, namely, BWP configuration and switching for the terminal is performed by the access network device. In V2X, there may be direct communication between the terminal and the access network device, and there may also be direct communication between the terminals. Therefore, the problem to be solved by the disclosure is how to perform the BWP configuration and switching in the V2X.

The disclosure relates to the BWP configuration and switching in the V2X. The BWP configuration process will be introduced below with reference to embodiments illustrated in FIG. 3 to FIG. 8. The BWP switching process will be introduced below with reference to embodiments illustrated in FIG. 9 to FIG. 10. The whole BWP configuration and switching process will be introduced below with reference to embodiments illustrated in FIG. 11 to FIG. 13.

Figure 3:
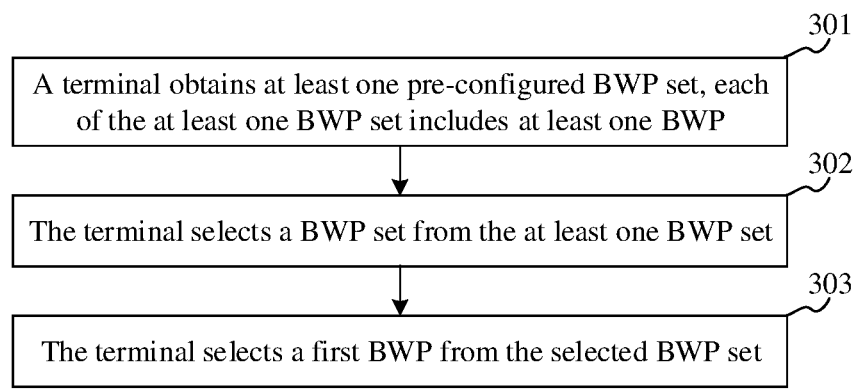
FIG. 3 is a flowchart illustrating a method for resource configuration according to an exemplary embodiment.

FIG. 3 is a flowchart illustrating a method for resource configuration according to an exemplary embodiment. The method for resource configuration is applied to a terminal. As illustrated in FIG. 3, the method for resource configuration includes the following operations.

At operation 301, a terminal obtains at least one pre-configured BWP set. Each of the at least one BWP set includes at least one BWP.

At operation 302, the terminal selects a BWP set from the at least one BWP set.

At operation 303, the terminal selects a first BWP from the selected BWP set.

According to the method for resource configuration provided in the disclosure, after the BWP set is selected from the at least one pre-configured BWP set, the terminal may select a BWP from the BWP set. In this way, the terminal may select the BWP by itself, without the need for the access network device to specify the BWP for the terminal. Therefore, the BWP may be introduced into the communication systems supporting a large bandwidth such as a D2D communication system, and a power consumption of the terminal is saved in these communication systems.

Figure 4:
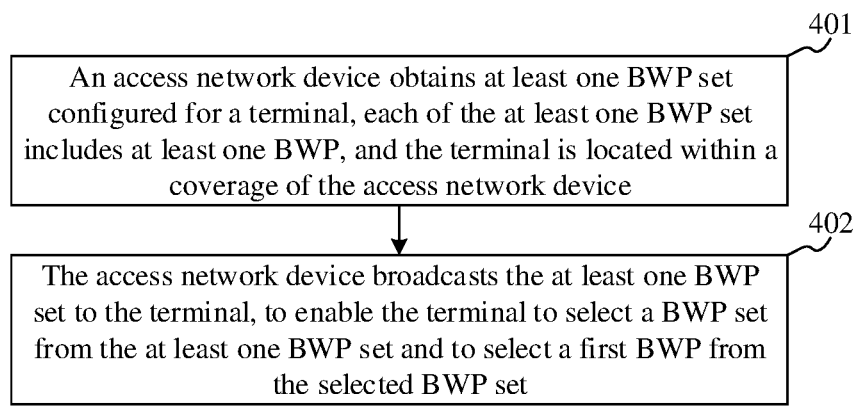
FIG. 4 is a flowchart illustrating a method for resource configuration according to an exemplary embodiment.

FIG. 4 is a flowchart illustrating a method for resource configuration according to another exemplary embodiment. The method for resource configuration is applied to an access network device. As illustrated in FIG. 4, the method for resource configuration includes the following operations.

At operation 401, an access network device obtains at least one BWP set configured for a terminal. Each of the at least one BWP set includes at least one BWP, and the terminal is located within a coverage of the access network device.

At operation 402, the access network device broadcasts the at least one BWP set to the terminal, to enable the terminal to select a BWP set from the at least one BWP set and to select a first BWP from the selected BWP set.

According to the method for resource configuration provided in the disclosure, the access network device broadcasts the at least one BWP set to the terminal, to enable the terminal to select the BWP set from the at least one BWP set and to select a BWP from the selected BWP set. In this way, the terminal may select the BWP by itself, without the need for the access network device to specify the BWP for the terminal. Therefore, the BWP may be introduced into the communication systems supporting the large bandwidth such as the D2D communication system, and the power consumption of the terminal is saved in these communication systems.

Since the at least one pre-configured BWP set is broadcast by the access network device to the terminal rather than pre-stored in the terminal, a storage space of the terminal may be saved.

Figure 5:
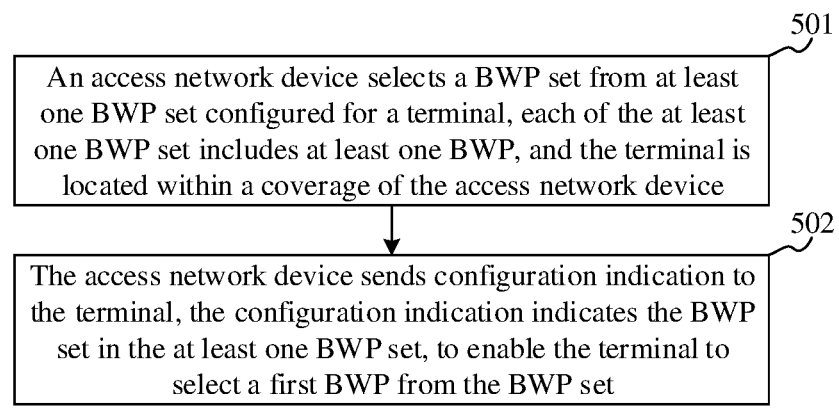
FIG. 5 is a flowchart illustrating a method for resource configuration according to an exemplary embodiment.

FIG. 5 is a flowchart illustrating a method for resource configuration according to another exemplary embodiment. The method for resource configuration is applied to an access network device. As illustrated in FIG. 5, the method for resource configuration includes the following operations.

At operation 501, an access network device selects a BWP set from at least one BWP set configured for a terminal. Each of the at least one BWP set includes at least one BWP, and the terminal is located within a coverage of the access network device.

At operation 502, the access network device sends configuration indication to the terminal. The configuration indication indicates the BWP set in the at least one BWP set, to enable the terminal to select a first BWP from the BWP set.

According to the method for resource configuration provided in the disclosure, the access network device specifies a BWP set for the terminal, then the terminal selects a BWP from the BWP set. In this way, the terminal may select the BWP by itself, without the need for the access network device to specify the BWP for the terminal. Therefore, the BWP may be introduced into the communication systems supporting the large bandwidth such as the D2D communication system, and the power consumption of the terminal is saved in these communication systems.

Since the BWP set is specified by the access network device for the terminal rather than selected by the terminal, the power consumption of the terminal when selecting the BWP set may be saved.

Figure 6:
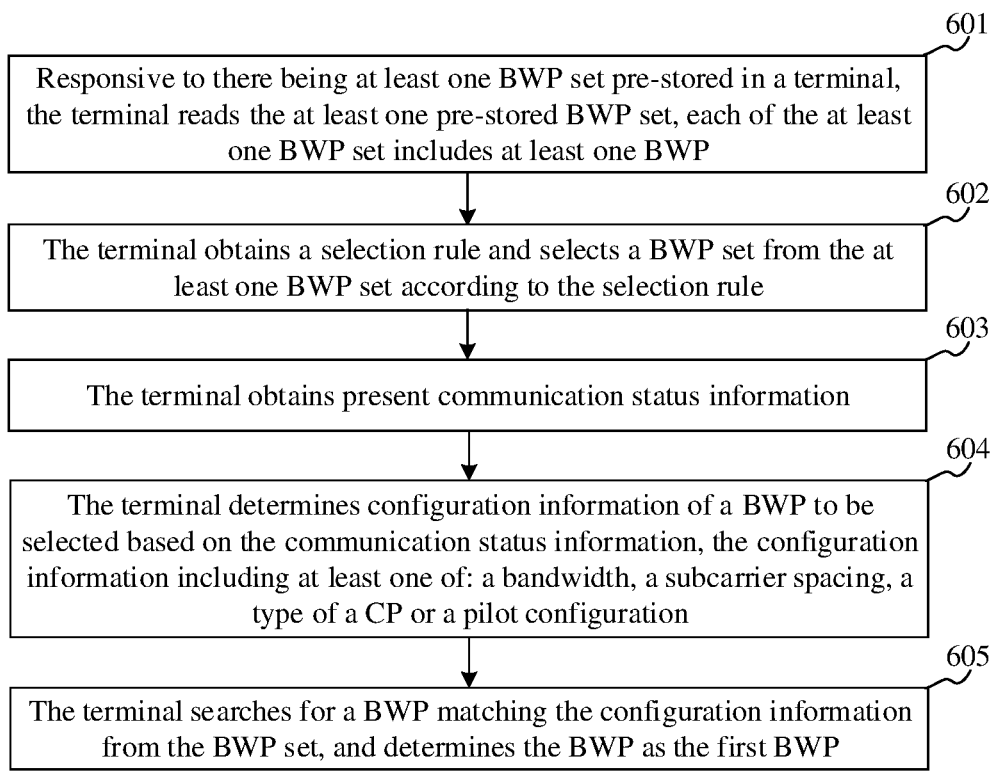
FIG. 6 is a flowchart illustrating a method for resource configuration according to an exemplary embodiment.
Figure 7:
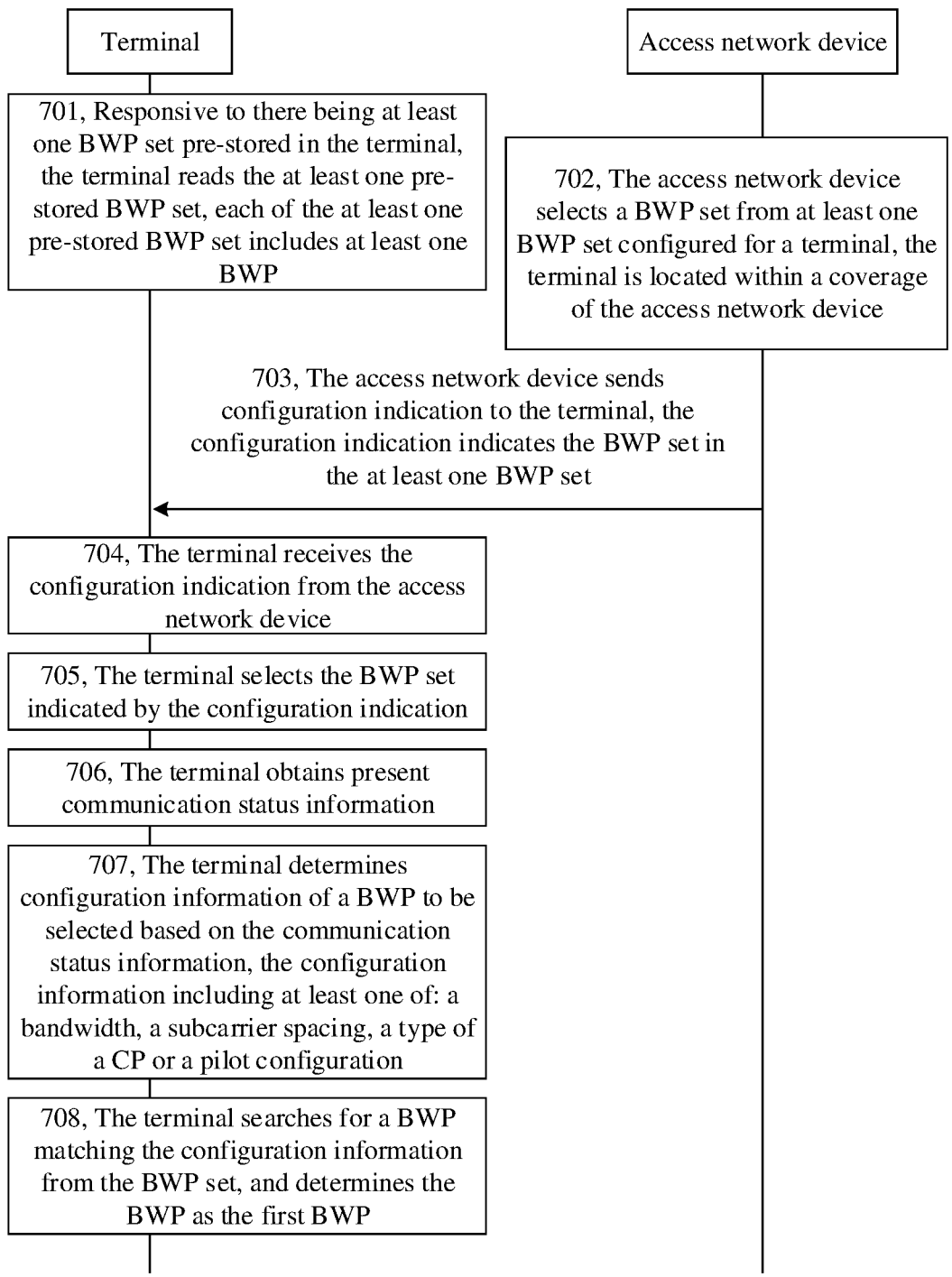
FIG. 7 is a flowchart illustrating a method for resource configuration according to an exemplary embodiment.
Figure 8:
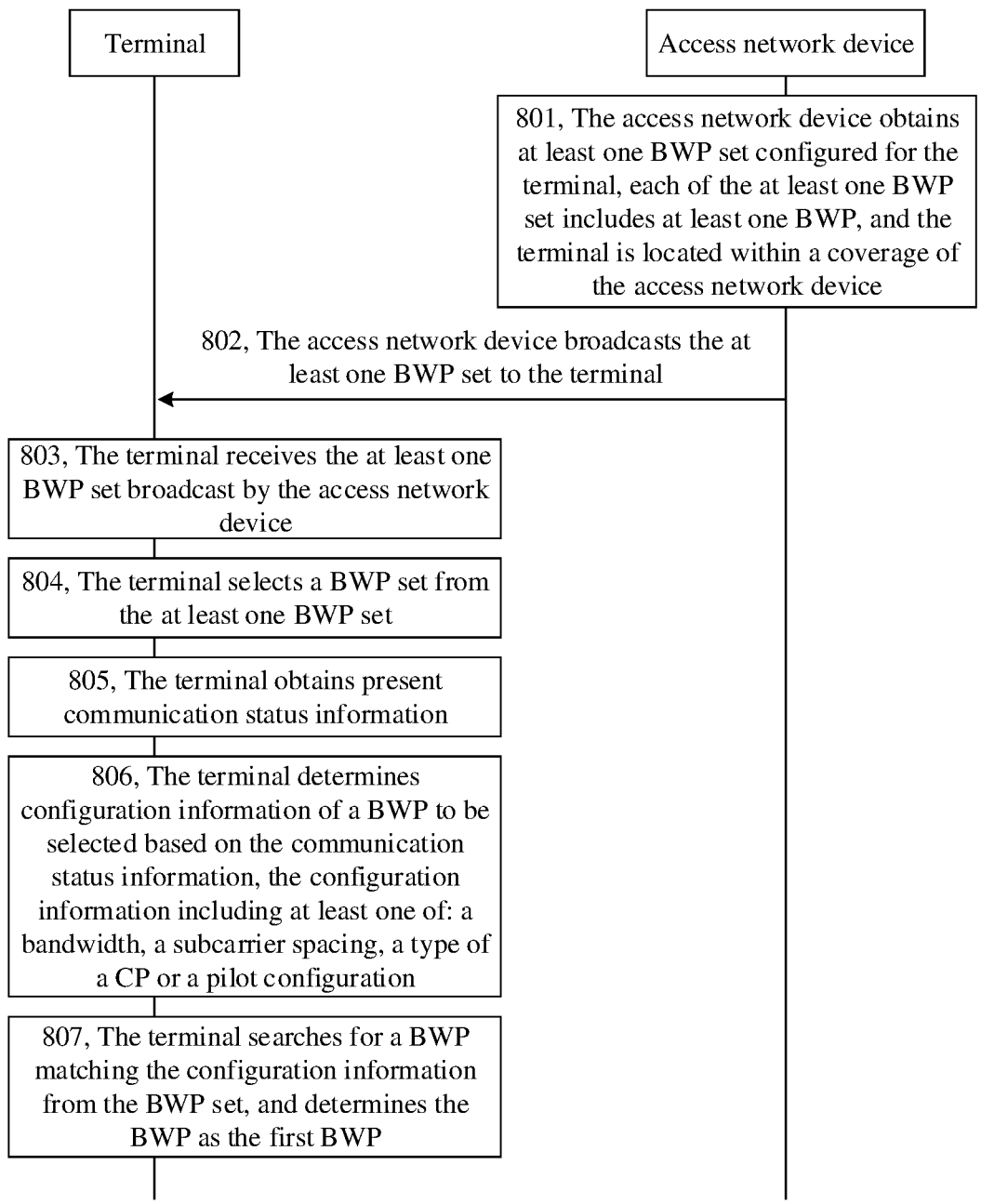
FIG. 8 is a flowchart illustrating a method for resource configuration according to an exemplary embodiment.

It should be noted that, in the operation of configuring the BWP, referring to the embodiment illustrated in FIG. 6, the terminal may configure the BWP by itself, and the access network device may also assist the terminal to configure the BWP, referring to the embodiments illustrated in FIG. 7-FIG. 8.

FIG. 6 is a flowchart illustrating a method for resource configuration according to an exemplary embodiment. The method for resource configuration is applied to a terminal. As illustrated in FIG. 6, the method for resource configuration includes the following operations.

At operation 601, responsive to there being at least one BWP set pre-stored in a terminal, the terminal reads the at least one pre-stored BWP set. Each of the at least one pre-stored BWP set includes at least one BWP.

In the embodiment, N BWPs may be pre-configured for communication systems such as a D2D communication system. For example, a fixed bandwidth allocated for a communication system is used for a terminal to communicate, and a configured BWP is therefore relatively fixed if the bandwidth is fixed. Therefore, the BWP configuration may be performed during factory manufacture of the terminal. That is, the N BWP sets may be pre-stored in the terminal during factory manufacture of the terminal. In this way, the terminal may directly read the pre-stored BWPs when it is necessary for the terminal to use the BWPs, and efficiency for obtaining a BWP is therefore improved. Herein, N may be selected according to actual situations. For example, N may be equal to 4 or other values, which is not limited in the embodiment.

The BWP configuration refers to configuring configuration information of BWP. The configuration information includes at least one of: a bandwidth, a subcarrier spacing, a type of a CP or a pilot configuration. The relationship between the four types of information and the terminal will be introduced below.

1) A size of the bandwidth is positively correlated with a size of traffic volume of the terminal. The larger the traffic volume of the terminal, the larger the bandwidth of the BWP to be configured; the smaller the traffic volume of the terminal, the smaller the bandwidth of the BWP to be configured.

2) A size of the subcarrier spacing is positively correlated with a moving speed of the terminal. That is, the faster the moving speed of the terminal, the larger the subcarrier spacing of the BWP to be configured, the slower the moving speed of the terminal, the smaller the subcarrier spacing of the BWP to be configured.

3) The type of the CP is correlated with a communication radius of the terminal. The type of the CP includes a normal type and an extended type. The communication radius corresponding to the extended type of the CP is larger than the communication radius corresponding to the normal type of the CP. That is, when the terminal is located in a lively urban area, there are a lot of other terminals nearby and the communication radius is relatively small, and the type of the CP of the BWP to be configured is the normal type. When the terminal is located in a desolate suburb area, there are fewer terminals nearby and the communication radius is relatively large, and the type of the CP of the BWP to be configured is the extended type.

4) The pilot configuration indicates a pilot density, and the pilot density is positively correlated with the moving speed of the terminal. That is, the faster the moving speed of the terminal, the larger the pilot density of the BWP to be configured, the slower the moving speed of the terminal, the smaller the pilot density of the BWP to be configured.

Since different terminals may have different requirements and the same terminal may also have different requirements at different times, the N BWPs may be configured according to the requirements of the terminal, and the configuration information of each BWP in the N BWPs is different. For example, types of information included in the configuration information of some BWPs are different; or, the types of information included in the configuration information of some BWPs are the same but a content of at least one type of information thereof is different, which is not limited in the embodiment.

If the number of BWPs configured for the terminal is large, these BWPs may also be classified. Each type of BWP is regarded as a BWP set, and each BWP set includes at least one BWP. Each BWP in a BWP set may be different from BWPs in other BWP sets, or, the BWPs in different BWP sets may be partially the same, which is not limited in the embodiment.

In the embodiment, the BWPs may be classified according to a capability of the terminal. For example, a BWP set may be allocated for terminals with a stronger capability, and another BWP set may be allocated for terminals with a weaker capability. The BWPs may also be classified according to an environment in which the terminal is located. For example, a BWP set may be allocated for terminals located in China, and another BWP set may be allocated for terminals located abroad. Of course, the BWPs may also be classified according to other rules, which is not limited in the embodiment.

At operation 602, the terminal obtains a selection rule and selects a BWP set from the at least one BWP set according to the selection rule.

The selection rule indicates a rule for selecting a BWP set from at least one BWP set.

For example, if the selection rule indicates a correspondence between the terminal capability and at least one BWP set, the terminal may select a BWP set from the at least one BWP set according to the capability of itself. As another example, if the selection rule indicates a correspondence between a country and at least one BWP set, the terminal may select a BWP set from the at least one BWP set according to the country where the terminal is located. The embodiment only uses the above two selection rules as examples. In the practical implementation, other selection rules may also be specified, which is not limited in the embodiment.

After the terminal selects the BWP set, a BWP may be selected from the BWP set as a first BWP, and a detailed introduction will be described in the operations 603-605 below. Since the terminal selects the BWP from the BWP set, instead of selecting the BWP from all of the BWPs, computing resources occupied for selecting the BWP may be saved, and the power consumption of the terminal may be saved.

At operation 603, the terminal obtains present communication status information.

The communication status information includes at least a moving speed of the terminal and a communication environment. The communication environment is used for indicating an environment in which the terminal is currently communicating. The communication environment may include an urban environment, a high-speed environment, a dense urban environment, a suburban environment, and the like.

When obtaining the moving speed, the terminal may obtain a moving distance of the terminal during a period of time by positioning, and then obtain the moving speed by dividing the moving distance by a duration of the period of time. The moving speed may also be calculated in other ways, which is not limited in the embodiment.

In an implementation, when obtaining the communication environment, the terminal may obtain a geographic location where the terminal is located by positioning, and then determine the communication environment in which the terminal is located according to an area division on a map. For example, when the geographic location where the terminal is located belongs to an urban area, the terminal may determine that the communication environment is an urban environment. When the geographic location where the terminal is located belongs to a suburban area, the terminal may determine that the communication environment is a suburban environment. In another implementation, the terminal may obtain parameters during wireless communication, such as a number of distinguishable multipaths, a delay of each path, a power of each path, and a distribution of a departure angle and a arrival angle of each path, then may use the parameters to determine the communication environment in which the terminal is located.

At operation 604, the terminal determines configuration information of a BWP to be selected based on the communication status information. The configuration information includes at least one of: a bandwidth, a subcarrier spacing, a type of a CP or a pilot configuration.

There is a certain relationship between the BWP that the terminal needs to select and the moving speed and the communication environment. For example, when the terminal is in a high-speed environment and the moving speed is high, a BWP with a large subcarrier spacing and a large pilot density may be selected. When the terminal is in a dense urban environment and the moving speed is slow, a BWP with a small communication radius and a large bandwidth may be selected, and the like.

When the terminal determines the configuration information of the BWP to be selected based on the communication status information, the terminal may read a pre-configured correspondence between the communication status information and the configuration information of the BWP, and then obtain the configuration information corresponding to the communication status information from the correspondence. As another example, the terminal may determine a value of each type of information in the configuration information of the BWP to be selected based on the communication status information, to obtain the configuration information. The terminal may also determine the configuration information of the BWP to be selected in other ways, which is not limited in this embodiment.

At operation 605, the terminal searches for a BWP matching the configuration information from the BWP set, and determines the BWP as the first BWP.

For each BWP in the BWP set selected in operation 602, the terminal may read configuration information of the BWP as candidate configuration information, and compare the candidate configuration information with the determined configuration information. If the candidate configuration information is the same as the determined configuration information, the terminal may select a BWP corresponding to the candidate configuration information as the first BWP. If the candidate configuration information is different from the determined configuration information, the terminal may not select the BWP corresponding to the candidate configuration information.

If all candidate configuration information of all BWPs in the BWP set is different from the configuration information, the terminal may search for candidate configuration information matching the configuration information from all the candidate configuration information, and select a BWP corresponding to the found candidate configuration information as the first BWP.

When selecting the candidate configuration information matching the configuration information, the terminal may select candidate configuration information with a highest matching degree with the configuration information from all the candidate configuration information. The highest matching degree means that an information type in the candidate configuration information is most similar to that in the configuration information, and a content of each type of the information is closest to that of the configuration information. Alternatively, the terminal may determine a most important information type according to a requirement at the moment, and then select candidate configuration information including this information type, and a content of the type of information is closest to that of the configuration information, from all the candidate configuration information. For example, when the terminal moves from a suburban environment to a dense urban environment, the traffic volume will increase at this time. Therefore, the terminal may use the bandwidth as the most important information type to select the candidate configuration information.

After selecting the first BWP, the terminal may perform available time-frequency resource detection on the first BWP, which may also be called as listen before talk (LBT). The terminal may perform data transmission on an available time-frequency resource when the terminal detects the available time-frequency resource.

According to the method for resource configuration provided in the disclosure, after the terminal selects the BWP set from the at least one pre-configured BWP set, the terminal may select a BWP from the BWP set. In this way, the BWP may be completely selected by the terminal itself, without the need for the access network device to specify the BWP set and the BWP for the terminal. Therefore, the BWP may be introduced into the communication systems supporting the large bandwidth such as the D2D communication system, and the power consumption of the terminal is saved in these communication systems.

Since the terminal selects a BWP from a BWP set, instead of selecting a BWP from all of the BWPs, the computing resources occupied for selecting the BWP may be saved, thus the power consumption of the terminal is saved.

FIG. 7 is a flowchart illustrating a method for resource configuration according to an exemplary embodiment. The method for resource configuration is applied to a terminal and an access network device. As illustrated in FIG. 7, the method for resource configuration includes the following operations.

At operation 701, responsive to there being at least one BWP set pre-stored in the terminal, the terminal reads the at least one pre-stored BWP set. Each of the at least one pre-stored BWP set includes at least one BWP.

The implementation process of operation 701 may refer to the description of operation 601, and will not be elaborated herein.

At operation 702, the access network device selects a BWP set from at least one BWP set configured for the terminal. The terminal is located within a coverage of the access network device.

The access network device may obtain a selection rule and select the BWP set from the at least one BWP set according to the selection rule, and reference may be made to the description of operation 602.

At operation 703, the access network device sends configuration indication to the terminal, the configuration indication indicates the BWP set in the at least one BWP set.

In the embodiment, an identification may be preset for each BWP set. The access network device may obtain the identification corresponding to the BWP set after selecting the BWP set, generate configuration indication carrying the identification and send the configuration indication to the terminal.

At operation 704, the terminal receives the configuration indication from the access network device.

At operation 705, the terminal selects the BWP set indicated by the configuration indication.

At operation 706, the terminal obtains present communication status information.

At operation 707, the terminal determines configuration information of a BWP to be selected based on the communication status information. The configuration information includes at least one of: a bandwidth, a subcarrier spacing, a type of a CP or a pilot configuration.

At operation 708, the terminal searches for a BWP matching the configuration information from the BWP set, and determines the BWP as the first BWP.

The implementation process of operations 706-708 may refer to the description of operations 603-605, and will not be elaborated herein.

Operations 701 and 704-708 may be implemented separately as the embodiment at the terminal side. Operations 702-703 may be implemented separately as the embodiment at the access network device side.

According to the method for resource configuration provided in the disclosure, after the access network device selects the BWP set for the terminal from the at least one pre-configured BWP set, the terminal may select a BWP from the BWP set. In this way, the terminal may select the BWP by itself, without the need for the access network device to specify the BWP for the terminal. Therefore, the BWP may be introduced into the communication systems supporting the large bandwidth such as the D2D communication system, and the power consumption of the terminal is saved in these communication systems.

Since the BWP set is specified by the access network device for the terminal rather than selected by the terminal, the power consumption of the terminal when selecting the BWP set may be saved.

FIG. 8 is a flowchart illustrating a method for resource configuration according to an exemplary embodiment. The method for resource configuration is applied to a terminal and an access network device. As illustrated in FIG. 8, the method for resource configuration includes the following operations.

At operation 801, the access network device obtains at least one BWP set configured for the terminal, each of the at least one BWP set includes at least one BWP, and the terminal is located within a coverage of the access network device.

When no fixed bandwidth is allocated to the communication system, namely, when the bandwidth allocated to the communication system is not fixed each time, the at least one BWP set configured for the bandwidth is also not fixed. Therefore, according to the bandwidth allocated to the communication system each time, the access network device may configure at least one BWP set, and notify the at least one BWP set to the terminal.

At operation 802, the access network device broadcasts the at least one BWP set to the terminal.

In the embodiment, the access network device may notify the at least one BWP set to the terminal by way of broadcasting, namely, the access network device may broadcast the at least one BWP set to the terminal.

At operation 803, the terminal receives the at least one BWP set broadcast by the access network device.

At operation 804, the terminal selects a BWP set from the at least one BWP set.

In a first implementation, the terminal obtains a selection rule and selects the BWP set from the at least one BWP set according to the selection rule, and reference may be made to the description of operation 602.

In a second implementation, the access network device selects the BWP set from the at least one BWP set, and sends configuration indication to the terminal, the configuration indication indicates the BWP set in the at least one BWP set. The terminal receives the configuration indication from the access network device, and selects the BWP set indicated by the configuration indication. Reference may be made to the description of operations 702-705.

At operation 805, the terminal obtains present communication status information.

At operation 806, the terminal determines configuration information of a BWP to be selected based on the communication status information. The configuration information includes at least one of: a bandwidth, a subcarrier spacing, a type of a CP or a pilot configuration.

At operation 807, the terminal searches for a BWP matching the configuration information from the BWP set, and determines the BWP as the first BWP.

The implementation process of operations 805-807 may refer to the description of operations 603-605, and will not be elaborated herein.

Herein, when the operation 804 is implemented in the first implementation, operations 803-807 may be implemented separately as the embodiment at the terminal side, and operations 801-802 may be implemented separately as the embodiment at the access network device side. When the operation 804 is implemented in the second implementation, operations 803-807 may be implemented separately as the embodiment at the terminal side, and operations 801-802 and 804 may be implemented separately as the embodiment at the access network device side.

According to the method for resource configuration provided in the disclosure, after a BWP set is selected from at least one pre-configured BWP set, the terminal may select a BWP from the BWP set. In this way, the terminal may select the BWP by itself, without the need for the access network device to specify the BWP for the terminal. Therefore, the BWP may be introduced into the communication systems supporting the large bandwidth such as the D2D communication system, and the power consumption of the terminal is saved in these communication systems.

Since the at least one pre-configured BWP set is broadcast by the access network device to the terminal rather than pre-stored in the terminal, the storage space of the terminal may be saved.

Figure 9:
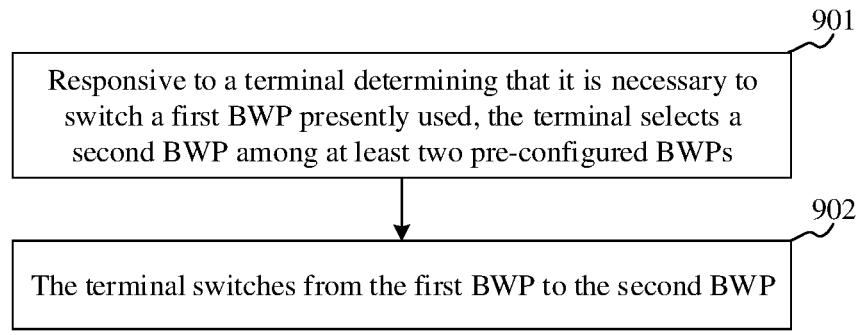
FIG. 9 is a flowchart illustrating a method for resource switching according to an exemplary embodiment.

FIG. 9 is a flowchart illustrating a method for resource switching according to an exemplary embodiment. The method for resource switching is applied to a terminal. As illustrated in FIG. 9, the method for resource switching includes the following operations.

At operation 901, responsive to determining that it is necessary to switch a first BWP presently used, the terminal selects a second BWP among at least two pre-configured BWPs.

At operation 902, the terminal switches from the first BWP to the second BWP.

According to the method for resource switching provided in the disclosure, responsive to determining that it is necessary to switch the first BWP presently used, the terminal selects the second BWP among the at least two pre-configured BWPs, and switches from the first BWP to the second BWP. In this way, the terminal may switch the BWP by itself, without the need for the access network device to specify the BWP for the terminal. Therefore, the BWP may be introduced into the communication systems supporting the large bandwidth such as the D2D communication system, and the power consumption of the terminal is saved in these communication systems. In addition, a quality of communication of the terminal may be ensured since the BWP may be switched timely.

Figure 10:
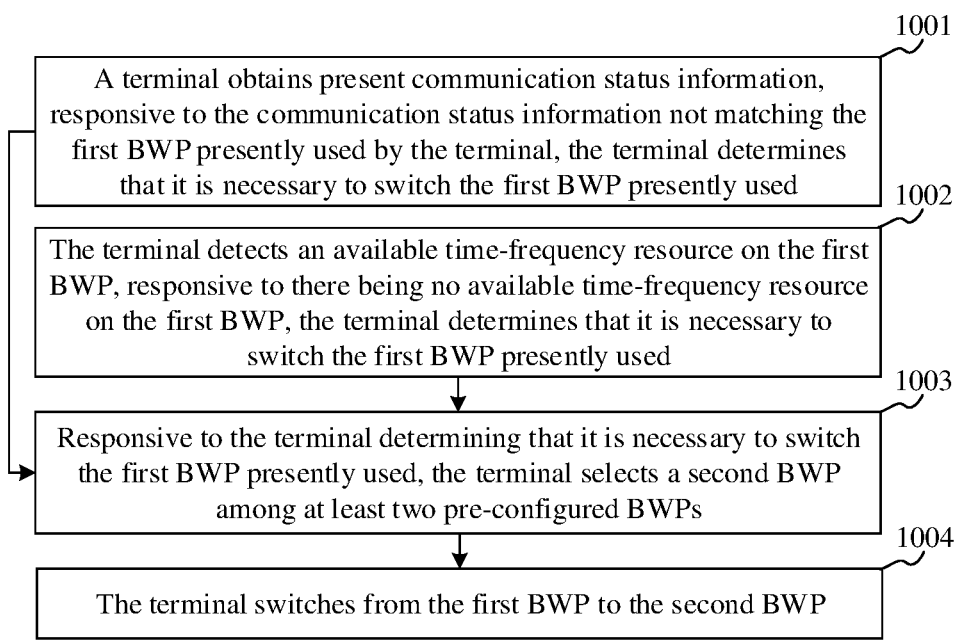
FIG. 10 is a flowchart illustrating a method for resource switching according to an exemplary embodiment.

FIG. 10 is a flowchart illustrating a method for resource switching according to an exemplary embodiment. The method for resource switching is applied to a terminal. As illustrated in FIG. 10, the method for resource switching includes the following operations.

The terminal uses the first BWP at present. When the terminal determines that it is necessary to switch the first BWP, the method provided in the embodiment is performed.

In the embodiment, two triggering modes for BWP switching are provided. The first triggering mode is that the first BWP does not match present communication status information of the terminal, i.e., the operation 1001. The second triggering mode is that there is no available time-frequency resource on the first BWP, i.e., the operation 1002. The terminal may initiate a BWP switching process according to any one of the above two triggering modes.

At operation 1001, a terminal obtains present communication status information. Responsive to the communication status information not matching the first BWP presently used by the terminal, the terminal determines that it is necessary to switch the first BWP presently used, and the process proceeds to operation 1003.

The detailed implementation process of the operation that the terminal obtains the present communication status information may refer to the description of operation 603, and will not be elaborated herein.

The terminal may determine the configuration information of the BWP to be selected based on the communication status information. When the determined configuration information is different from the configuration information of the first BWP, it is determined that the communication status information does not match the first BWP, and it is necessary for the terminal to switch the first BWP. The detailed implementation process of the operation that the terminal determines the configuration information of the BWP to be selected based on the communication status information may refer to the description of operation 604.

At operation 1002, the terminal detects an available time-frequency resource on the first BWP. Responsive to there being no available time-frequency resource on the first BWP, the terminal determines that it is necessary to switch the first BWP presently used, and the process proceeds to operation 1003.

During the process of using the first BWP, it is necessary for the terminal to use the available time-frequency resource on the first BWP for data transmission. When there is no available time-frequency resource on the first BWP, the terminal determines that it is necessary to switch the first BWP.

At operation 1003, responsive to determining that it is necessary to switch the first BWP presently used, the terminal selects a second BWP among at least two pre-configured BWPs.

The operation that the terminal selects the second BWP among the at least two pre-configured BWPs may include the following actions. The terminal determines configuration information of a BWP to be switched to based on the communication status information. The configuration information includes at least one of: a bandwidth, a subcarrier spacing, a type of a CP or a pilot configuration. The terminal searches for a BWP matching the configuration information among the at least two pre-configured BWPs, and determines the BWP as the second BWP.

It should be noted that the implementation process of the operation that the terminal selects the second BWP is the same as the implementation process of the operation that the terminal selects the first BWP, and reference may be made to the description of operations 604-605.

At operation 1004, the terminal switches from the first BWP to the second BWP.

After the terminal switches from the first BWP to the second BWP, the terminal may perform data transmission on an available time-frequency resource in the second BWP. Before the terminal performs the data transmission, it is necessary for the terminal to detect an available time-frequency resource on the BWP. The operation for switching and the operation for available time-frequency resource detection are two independent operations that do not affect each other. Therefore, the terminal may perform the available time-frequency resource detection before the switching, and then perform data transmission. The terminal may also perform the available time-frequency resource detection after the switching, and then perform the data transmission. The terminal may also perform the available time-frequency resource detection before and after the switching, and then perform the data transmission. The three data transmission modes are introduced below respectively.

In the first data transmission mode, after the terminal switches from the first BWP to the second BWP, the terminal detects an available time-frequency resource on the second BWP to acquire the available time-frequency resource. The terminal performs data transmission on the available time-frequency resource.

After switching to the second BWP, the terminal may perform data transmission only on the available time-frequency resource in the second BWP. Therefore, the terminal may detect the available time-frequency resource on the second BWP after switching to the second BWP. In this way, it is possible to avoid the problem of higher power consumption of the terminal caused by the fact that if the available time-frequency resource detection is performed before switching to the second BWP, it is necessary to detect the available time-frequency resources on all of the BWPs since the BWP to be switched to is unknown. Therefore, the power consumption of the terminal may be saved.

It should be noted that, the capabilities of some terminals are weak and do not support detecting the available time-frequency resources on all of the BWPs. Therefore, the terminal may detect the available time-frequency resource on the second BWP after switching to the second BWP.

In the second data transmission mode, before the terminal selects the second BWP, the terminal detects an available time-frequency resource on each of pre-stored BWPs to acquire the available time-frequency resource in the BWP. The pre-stored BWPs include the second BWP. After the terminal switches from the first BWP to the second BWP, the terminal performs data transmission on the available time-frequency resource in the second BWP.

If the capability of the terminal is strong, the terminal may detect the available time-frequency resource on each BWP before selecting the second BWP, to determine the available time-frequency resource on each BWP. After the terminal switches to the second BWP, the terminal determines the available time-frequency resource in the second BWP according to the previously detected available time-frequency resource in each BWP, and defaults to the available time-frequency resource in the second BWP being still available. That is, the available time-frequency resource in the second BWP is not occupied by other terminals during switching. The data transmission is performed on the available time-frequency resource in the second BWP.

The terminal may use the previously detected available time-frequency resource for data transmission after switching to the second BWP, without the need to detect the available time-frequency resource on the second BWP again. Therefore, the efficiency of data transmission may be improved.

In the third data transmission mode, before the terminal selects the second BWP, the terminal detects an available time-frequency resource on each of pre-stored BWPs to acquire the available time-frequency resource in the BWP. The pre-stored BWPs include the second BWP. After the terminal switches from the first BWP to the second BWP, the terminal detects an available time-frequency resource on the second BWP again to acquire the available time-frequency resource. The terminal performs data transmission on the available time-frequency resource acquired again.

If the capability of the terminal is strong, the terminal may detect the available time-frequency resource on each BWP before selecting the second BWP, to determine the available time-frequency resource on each BWP. After the terminal switches to the second BWP, the available time-frequency resource may be occupied by other terminals during the switching, and the terminal detects the available time-frequency resource on the second BWP again to acquire a time-frequency resource that is available at this time. The terminal performs data transmission on the available time-frequency resource acquired again.

Since the terminal may detect the available time-frequency resource again after the terminal switches to the second BWP, the problem of transmission failure when the terminal uses the previously detected available time-frequency resource for data transmission, caused by the fact that the available time-frequency resource is occupied by other terminals during the switching, may be avoided. Therefore, the success rate of data transmission may be improved.

According to the method for resource switching provided in the disclosure, responsive to determining that it is necessary to switch the first BWP presently used, the terminal selects the second BWP among the at least two pre-configured BWPs, and switches from the first BWP to the second BWP. In this way, the terminal may switch the BWP by itself, without the need for the access network device to specify the BWP for the terminal. Therefore, the BWP may be introduced into the communication systems supporting the large bandwidth such as the D2D communication system, and the power consumption of the terminal is saved in these communication systems. In addition, a quality of communication of the terminal may be ensured since the BWP may be switched timely.

After switching to the second BWP, the terminal may perform data transmission only on the available time-frequency resource in the second BWP. Therefore, the terminal may detect the available time-frequency resource on the second BWP after switching to the second BWP. In this way, it is possible to avoid the problem of the higher power consumption of the terminal caused by the fact that if the available time-frequency resource detection is performed before switching to the second BWP, it is necessary to detect the available time-frequency resources on all of the BWPs since the BWP to be switched to is unknown. Therefore, the power consumption of the terminal may be saved.

The terminal may use the previously detected available time-frequency resource for data transmission after switching to the second BWP, without the need to detect the available time-frequency resource on the second BWP again. Therefore, the efficiency of data transmission may be improved.

Since the terminal may detect the available time-frequency resource again after the terminal switches to the second BWP, the problem of transmission failure when the terminal uses the previously detected available time-frequency resource for data transmission, caused by the fact that the available time-frequency resource is occupied by other terminals during the switching, may be avoided. Therefore, the success rate of data transmission may be improved.

It should be noted that in the disclosure, the BWP configuration may be performed only according to any of the embodiments illustrated in FIGS. 6-8. The BWP switching may be performed only according to the embodiment illustrated in FIG. 10. Alternatively, the BWP configuration may be performed firstly according to any of the embodiments illustrated in FIGS. 6-8, and then the BWP switching may be performed according to the embodiment illustrated in FIG. 10. The whole BWP configuration and switching process will be introduced below with reference to embodiments illustrated in FIGS. 11 to 13.

Figure 11:
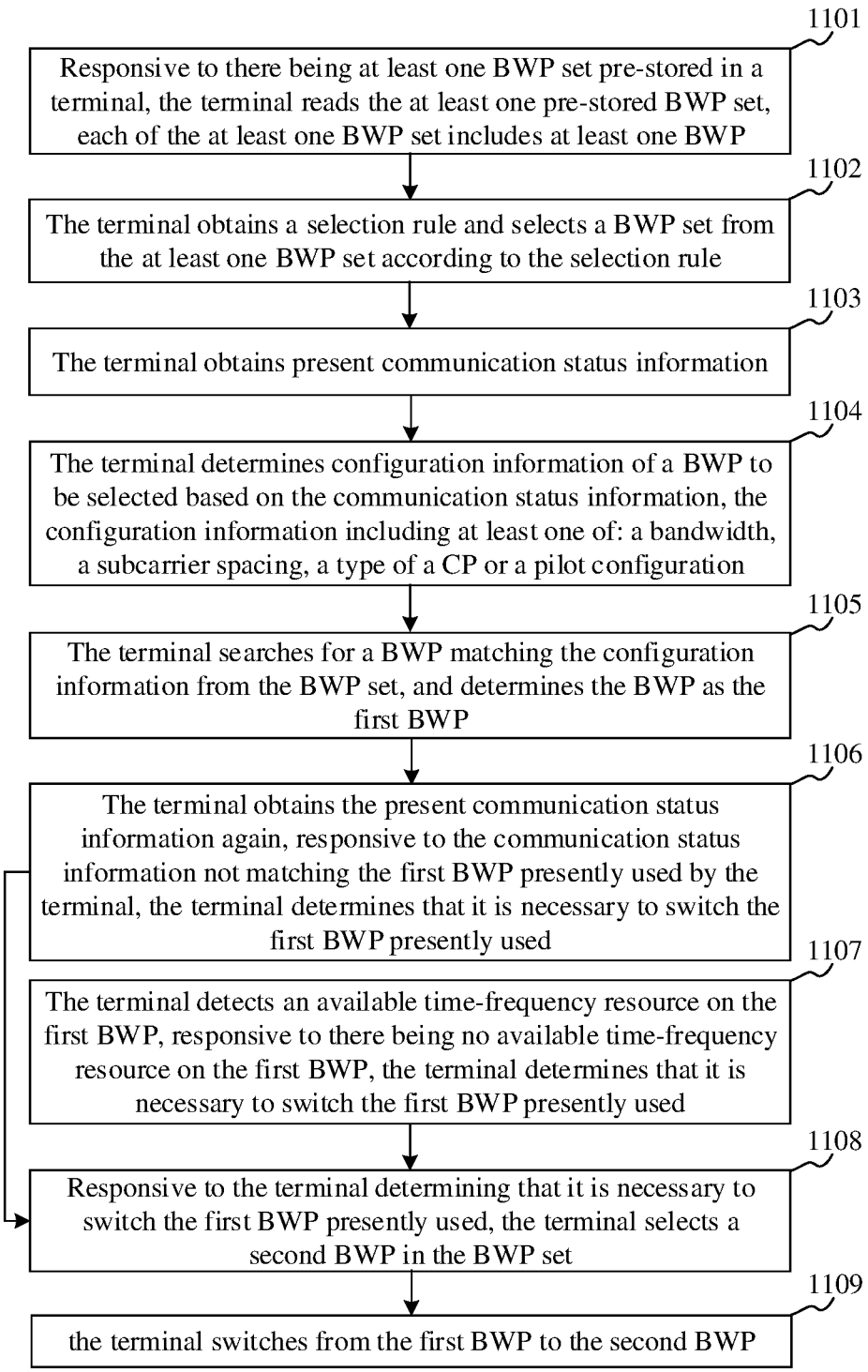
FIG. 11 is a flowchart illustrating a method for resource configuration and resource switching according to an exemplary embodiment.

FIG. 11 is a flowchart illustrating a method for resource configuration and switching according to an exemplary embodiment. As illustrated in FIG. 11, the method for resource configuration and switching includes the following operations.

At operation 1101, responsive to there being at least one BWP set pre-stored in a terminal, the terminal reads the at least one pre-stored BWP set. Each of the at least one BWP set includes at least one BWP.

At operation 1102, the terminal obtains a selection rule and selects a BWP set from the at least one BWP set according to the selection rule.

At operation 1103, the terminal obtains present communication status information.

At operation 1104, the terminal determines configuration information of a BWP to be selected based on the communication status information. The configuration information includes at least one of: a bandwidth, a subcarrier spacing, a type of a CP or a pilot configuration.

At operation 1105, the terminal searches for a BWP matching the configuration information from the BWP set, and determines the BWP as the first BWP.

The implementation process of operations 1101-1105 may refer to the description of the embodiment illustrated in FIG. 6.

In the embodiment, two triggering modes for switching BWP are provided. The first triggering mode is that the first BWP does not match the present communication status information of the terminal, i.e., the operation 1106. The second triggering mode is that there is no available time-frequency resource on the first BWP, i.e., the operation 1107. The terminal may initiate the BWP switching process according to any one of the above two triggering modes.

At operation 1106, the terminal obtains the present communication status information again. Responsive to the communication status information not matching the first BWP presently used by the terminal, the terminal determines that it is necessary to switch the first BWP presently used, and the process proceeds to operation 1108.

At operation 1107, the terminal detects an available time-frequency resource on the first BWP. Responsive to there being no available time-frequency resource on the first BWP, the terminal determines that it is necessary to switch the first BWP presently used, and the process proceeds to operation 1108.

At operation 1108, responsive to determining that it is necessary to switch the first BWP presently used, the terminal selects a second BWP in the BWP set.

The operation that the terminal selects the second BWP in the BWP set may include the following actions. The terminal determines configuration information of the BWP to be switched to based on the communication status information. The configuration information includes at least one of: a bandwidth, a subcarrier spacing, a type of a CP or a pilot configuration. The terminal searches for a BWP matching the configuration information in the BWP set, and determines the BWP as the second BWP.

It should be noted that in the operation of selecting the second BWP, the terminal selects the second BWP in the BWP set selected in the operation 1102.

At operation 1109, the terminal switches from the first BWP to the second BWP.

The implementation process of operations 1106-1109 may refer to the description of the embodiment illustrated in FIG. 10.

According to the method for resource configuration and switching provided in the disclosure, after the terminal selects the BWP set from the at least one pre-configured BWP set, the terminal may select the first BWP from the BWP set and then switch from the first BWP to the second BWP. In this way, the terminal may configure and switch the BWP by itself, without the need for the access network device to specify the BWP for the terminal. Therefore, the BWP may be introduced into the communication systems supporting the large bandwidth such as the D2D communication system, and the power consumption of the terminal is saved in these communication systems. In addition, a quality of communication of the terminal may be ensured since the BWP may be switched timely.

Since the terminal selects the BWP from the BWP set, instead of selecting the BWP from all of the BWPs, the computing resources occupied for selecting the BWP may be saved, thereby the power consumption of the terminal is saved.

After switching to the second BWP, the terminal may perform data transmission only on the available time-frequency resource in the second BWP. Therefore, the terminal may detect the available time-frequency resource on the second BWP after switching to the second BWP. In this way, it is possible to avoid the problem of the higher power consumption of the terminal caused by the fact that if the available time-frequency resource detection is performed before switching to the second BWP, it is necessary to detect the available time-frequency resources on all of the BWPs since the BWP to be switched to is unknown. Therefore, the power consumption of the terminal may be saved.

The terminal may use the previously detected available time-frequency resource for data transmission after switching to the second BWP, without the need to detect the available time-frequency resource on the second BWP again. Therefore, the efficiency of data transmission may be improved.

Since the terminal may detect the available time-frequency resource again after the terminal switches to the second BWP, the problem of transmission failure when the terminal uses the previously detected available time-frequency resource for data transmission, caused by the fact that the available time-frequency resource is occupied by other terminals during the switching, may be avoided. Therefore, the success rate of data transmission may be improved.

Figure 12:
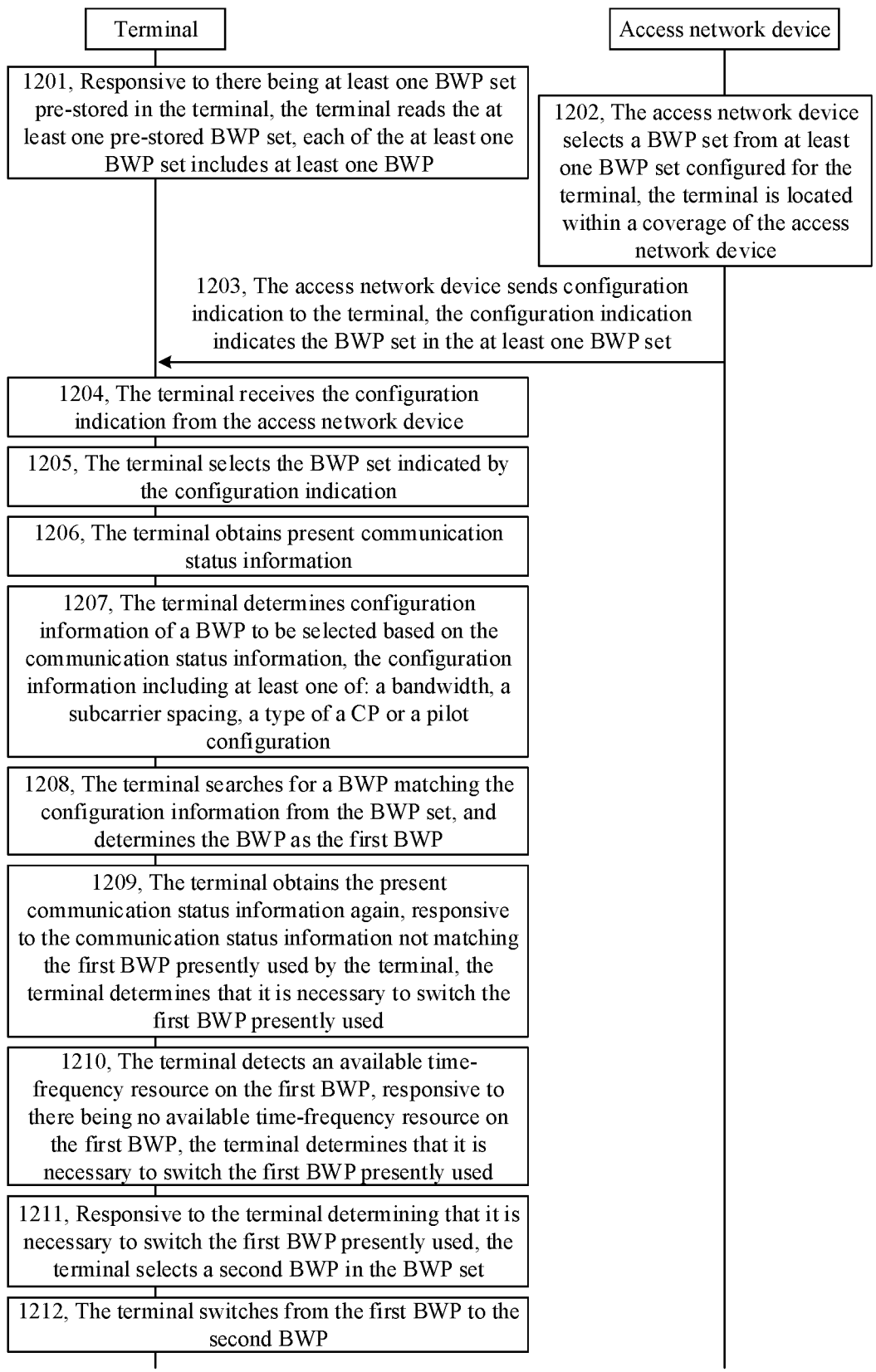
FIG. 12 is a flowchart illustrating a method for resource configuration and resource switching according to an exemplary embodiment.

FIG. 12 is a flowchart illustrating a method for resource configuration and switching according to an exemplary embodiment. As illustrated in FIG. 12, the method for resource configuration and switching includes the following operations.

At operation 1201, responsive to there being at least one BWP set pre-stored in a terminal, the terminal reads the at least one pre-stored BWP set. Each of the at least one BWP set includes at least one BWP.

At operation 1202, an access network device selects a BWP set from at least one BWP set configured for the terminal. The terminal is located within a coverage of the access network device.

At operation 1203, the access network device sends configuration indication to the terminal, and the configuration indication indicates the BWP set in the at least one BWP set.

At operation 1204, the terminal receives the configuration indication from the access network device.

At operation 1205, the terminal selects the BWP set indicated by the configuration indication.

At operation 1206, the terminal obtains present communication status information.

At operation 1207, the terminal determines configuration information of a BWP to be selected based on the communication status information. The configuration information includes at least one of: a bandwidth, a subcarrier spacing, a type of a CP or a pilot configuration.

At operation 1208, the terminal searches for a BWP matching the configuration information from the BWP set, and determines the BWP as the first BWP.

The implementation process of operations 1201-1208 may refer to the description of the embodiment illustrated in FIG. 7.

In the embodiment, two triggering modes for switching BWP are provided. The first triggering mode is that the first BWP does not match the present communication status information of the terminal, i.e., the operation 1209. The second triggering mode is that there is no available time-frequency resource on the first BWP, i.e., the operation 1210. The terminal may initiate the BWP switching process according to any one of the above two triggering modes.

At operation 1209, the terminal obtains the present communication status information again. Responsive to the communication status information not matching the first BWP presently used by the terminal, the terminal determines that it is necessary to switch the first BWP presently used, and the process proceeds to operation 1211.

At operation 1210, the terminal detects an available time-frequency resource on the first BWP. Responsive to there being no available time-frequency resource on the first BWP, the terminal determines that it is necessary to switch the first BWP presently used, and the process proceeds to operation 1211.

At operation 1211, responsive to determining that it is necessary to switch the first BWP presently used, the terminal selects a second BWP in the BWP set.

The operation that the terminal selects the second BWP in the BWP set may include the following actions. The terminal determines configuration information of the BWP to be switched to based on the communication status information. The configuration information includes at least one of: a bandwidth, a subcarrier spacing, a type of a CP or a pilot configuration. The terminal searches for a BWP matching the configuration information in the BWP set, and determines the BWP as the second BWP.

It should be noted that when selecting the second BWP, the terminal selects the second BWP in the BWP set selected in the operation 1205.

At operation 1212, the terminal switches from the first BWP to the second BWP.

The implementation process of the operations 1209-1212 may refer to the description of the embodiment illustrated in FIG. 10.

According to the method for resource configuration and switching provided in the disclosure, after the access network device selects the BWP set for the terminal from the at least one pre-configured BWP set, the terminal may select the BWP from the BWP set and switch from the first BWP to the second BWP. In this way, the terminal may configure and switch the BWP by itself, without the need for the access network device to specify the BWP for the terminal. Therefore, the BWP may be introduced into the communication systems supporting the large bandwidth such as the D2D communication system, and the power consumption of the terminal is saved in these communication systems. In addition, a quality of communication of the terminal may be ensured since the BWP may be switched timely.

Since the BWP set is specified by the access network device for the terminal rather than selected by the terminal, the power consumption when the terminal selecting the BWP set is saved.

After switching to the second BWP, the terminal may perform data transmission only on the available time-frequency resource in the second BWP. Therefore, the terminal may detect the available time-frequency resource on the second BWP after switching to the second BWP. In this way, it is possible to avoid the problem of the higher power consumption of the terminal caused by the fact that if the available time-frequency resource detection is performed before switching to the second BWP, it is necessary to detect the available time-frequency resources on all of the BWPs since the BWP to be switched to is unknown. Therefore, the power consumption of the terminal may be saved.

The terminal may use the previously detected available time-frequency resource for data transmission after switching to the second BWP, without the need to detect the available time-frequency resource on the second BWP again. Therefore, the efficiency of data transmission may be improved.

Since the terminal may detect the available time-frequency resource again after the terminal switches to the second BWP, the problem of transmission failure when the terminal uses the previously detected available time-frequency resource for data transmission, caused by the fact that the available time-frequency resource is occupied by other terminals during the switching, may be avoided. Therefore, the success rate of data transmission may be improved.

Figure 13:
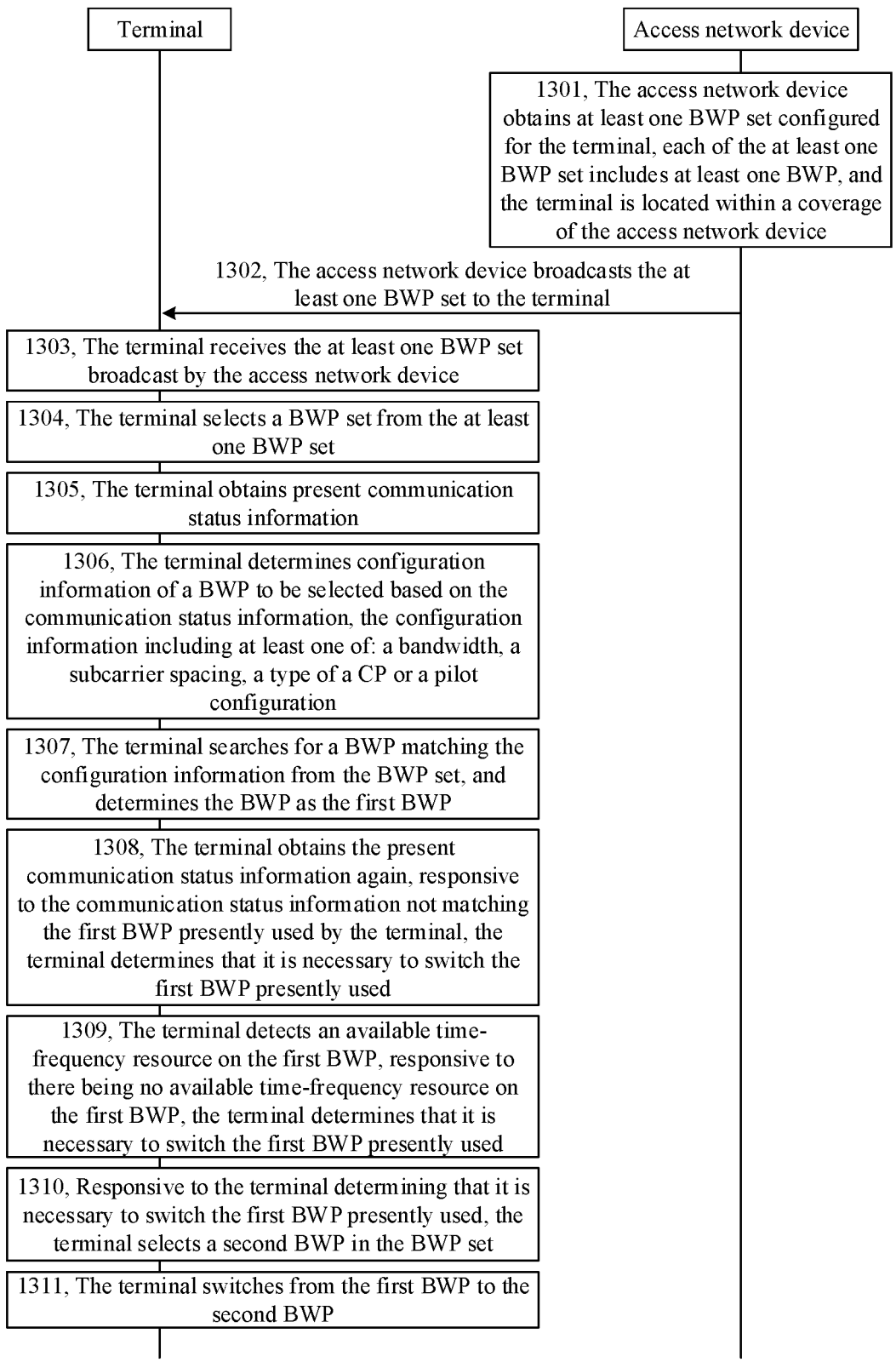
FIG. 13 is a flowchart illustrating a method for resource configuration and resource switching according to an exemplary embodiment.

FIG. 13 is a flowchart illustrating a method for resource configuration and switching according to an exemplary embodiment. As illustrated in FIG. 13, the method for resource configuration and switching includes the following operations.

At operation 1301, an access network device obtains at least one BWP set configured for a terminal. Each of the at least one BWP set includes at least one BWP, and the terminal is located within a coverage of the access network device.

At operation 1302, the access network device broadcasts the at least one BWP set to the terminal.

At operation 1303, the terminal receives the at least one BWP set broadcast by the access network device.

At operation 1304, the terminal selects a BWP set from the at least one BWP set.

The implementation process of the operation that the terminal selects the BWP set may refer to the description of operation 804, and will not be elaborated herein.

At operation 1305, the terminal obtains present communication status information.

At operation 1306, the terminal determines configuration information of a BWP to be selected based on the communication status information. The configuration information includes at least one of: a bandwidth, a subcarrier spacing, a type of a CP or a pilot configuration.

At operation 1307, the terminal searches for a BWP matching the configuration information from the BWP set, and determines the BWP as the first BWP.

The implementation process of operations 1301-1307 may refer to the description of the embodiment illustrated in FIG. 8.

In the embodiment, two triggering modes for switching BWP are provided. The first triggering mode is that the first BWP does not match the present communication status information of the terminal, i.e., the operation 1308. The second triggering mode is that there is no available time-frequency resource on the first BWP, i.e., the operation 1309. The terminal may initiate the BWP switching process according to any one of the above two triggering modes.

At operation 1308, the terminal obtains the present communication status information again. Responsive to the communication status information not matching the first BWP presently used by the terminal, the terminal determines that it is necessary to switch the first BWP presently used, and the process proceeds to operation 1310.

At operation 1309, the terminal detects an available time-frequency resource on the first BWP. Responsive to there being no available time-frequency resource on the first BWP, the terminal determines that it is necessary to switch the first BWP presently used, and the process proceeds to operation 1310.

At operation 1310, responsive to determining that it is necessary to switch the first BWP presently used, the terminal selects a second BWP in the BWP set.

The operation that the terminal selects the second BWP in the BWP set may include the following actions. The terminal determines configuration information of a BWP to be switched to based on the communication status information. The configuration information includes at least one of: a bandwidth, a subcarrier spacing, a type of a CP or a pilot configuration. The terminal searches for a BWP matching the configuration information in the BWP set, and determines the BWP as the second BWP.

It should be noted that in the operation of selecting the second BWP, the terminal selects the second BWP in the BWP set selected in the operation 1304.

At operation 1311, the terminal switches from the first BWP to the second BWP.

The implementation process of the operations 1308-1311 may refer to the description of the embodiment illustrated in FIG. 10.

According to the method for resource configuration and switching provided in the disclosure, after the BWP set is selected from the at least one pre-configured BWP set, the terminal may select the first BWP from the BWP set and switch from the first BWP to the second BWP. In this way, the terminal may configure and switch the BWP by itself, without the need for the access network device to specify the BWP for the terminal. Therefore, the BWP may be introduced into the communication systems supporting the large bandwidth such as the D2D communication system, and the power consumption of the terminal is saved in these communication systems. In addition, a quality of communication of the terminal may be ensured since the BWP may be switched timely.

Since the at least one pre-configured BWP set is broadcast by the access network device to the terminal, rather than pre-stored in the terminal, the storage space of the terminal is saved.

After switching to the second BWP, the terminal may perform data transmission only on the available time-frequency resource in the second BWP. Therefore, the terminal may detect the available time-frequency resource on the second BWP after switching to the second BWP. In this way, it is possible to avoid the problem of the higher power consumption of the terminal caused by the fact that if the available time-frequency resource detection is performed before switching to the second BWP, it is necessary to detect the available time-frequency resources on all of the BWPs since the BWP to be switched to is unknown. Therefore, the power consumption of the terminal may be saved.

The terminal may use the previously detected available time-frequency resource for data transmission after switching to the second BWP, without the need to detect the available time-frequency resource on the second BWP again. Therefore, the efficiency of data transmission may be improved.

Since the terminal may detect the available time-frequency resource again after the terminal switches to the second BWP, the problem of transmission failure when the terminal uses the previously detected available time-frequency resource for data transmission, caused by the fact that the available time-frequency resource is occupied by other terminals during the switching, may be avoided. Therefore, the success rate of data transmission may be improved.

Figure 14:
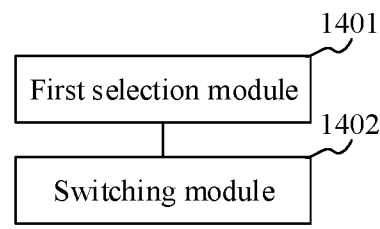
FIG. 14 is a block diagram illustrating an apparatus for resource switching according to an exemplary embodiment.

FIG. 14 is a block diagram illustrating an apparatus for resource switching according to an exemplary embodiment. The apparatus for resource switching is applied to a terminal. As illustrated in FIG. 14, the apparatus for resource switching includes a first selection module 1401 and a switching module 1402.

The first selection module 1401 is configured to, responsive to a terminal determining that it is necessary to switch a first BWP presently used, select a second BWP among at least two pre-configured BWPs.

The switching module 1402 is configured to switch from the first BWP to the second BWP selected by the first selection module 1401.

Figure 15:
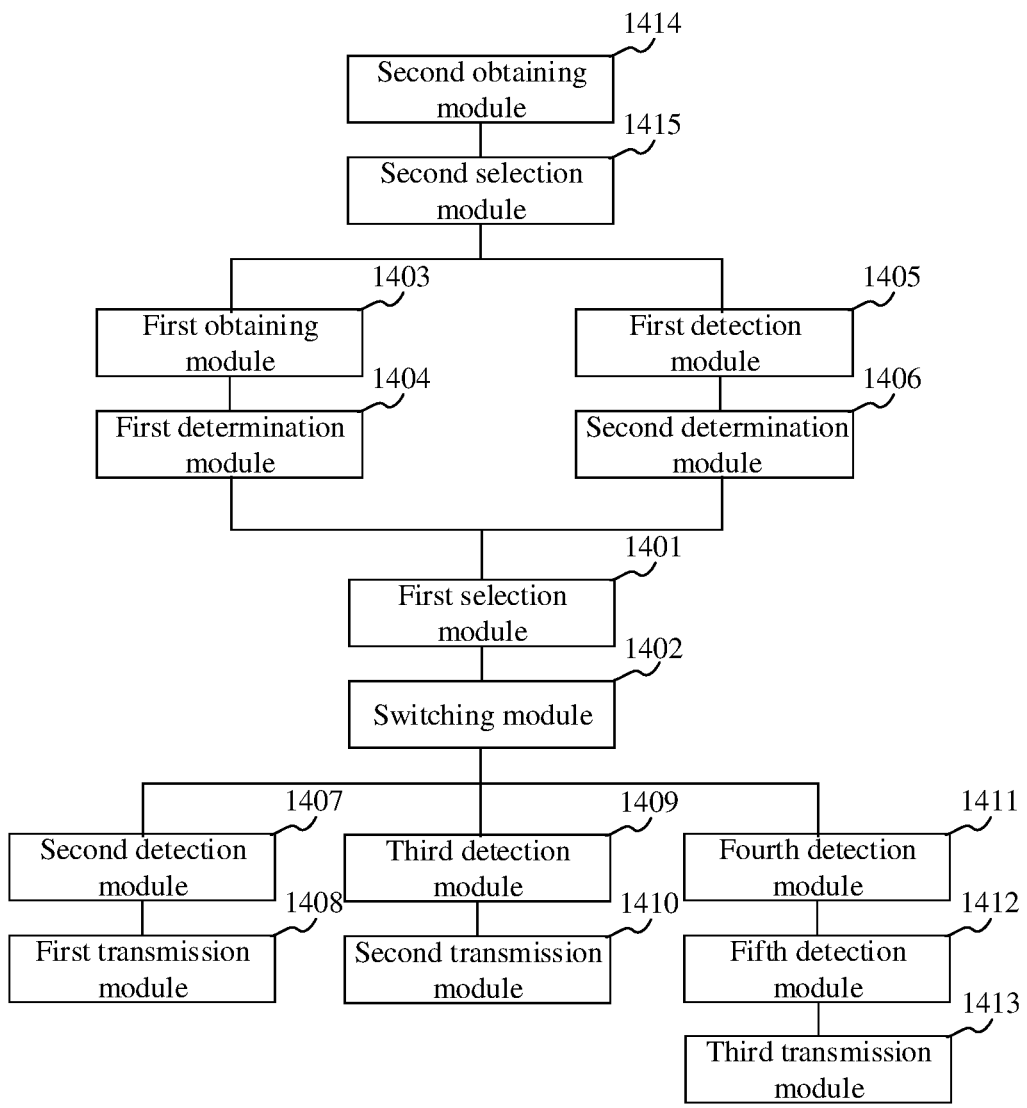
FIG. 15 is a block diagram illustrating an apparatus for resource switching according to an exemplary embodiment.

Referring to FIG. 15, in an embodiment of the disclosure, the apparatus may further include a first obtaining module 1403 and a first determination module 1404.

The first obtaining module 1403 is configured to obtain present communication status information.

The first determination module 1404 is configured to, responsive to the communication status information not matching the first BWP presently used by the terminal, determine that it is necessary to switch the first BWP presently used.

In an embodiment of the disclosure, the first selection module 1401 may be further configured to: determine configuration information of a BWP to be switched to based on the communication status information, the configuration information including at least one of: a bandwidth, a subcarrier spacing, a type of a CP or a pilot configuration; and search for a BWP matching the configuration information among the at least two pre-configured BWPs, and determine the BWP as the second BWP.

In an embodiment of the disclosure, the apparatus may further include a first detection module 1405 and a second determination module 1406.

The first detection module 1405 is configured to detect an available time-frequency resource on the first BWP.

The second determination module 1406 is configured to, responsive to there being no available time-frequency resource on the first BWP, determine that it is necessary to switch the first BWP presently used.

In an embodiment of the disclosure, the apparatus may further include a second detection module 1407 and a first transmission module 1408.

The second detection module 1407 is configured to, after the terminal switches from the first BWP to the second BWP, detect an available time-frequency resource on the second BWP to acquire the available time-frequency resource.

The first transmission module 1408 is configured to perform data transmission on the available time-frequency resource acquired by the second detection module 1407.

In an embodiment of the disclosure, the apparatus may further include a third detection module 1409 and a second transmission module 1410.

The third detection module 1409 is configured to, before the terminal selects the second BWP, detect an available time-frequency resource on each of pre-stored BWPs to acquire the available time-frequency resource in the BWP. The pre-stored BWPs include the second BWP.

The second transmission module 1410 is configured to, after the terminal switches from the first BWP to the second BWP, perform data transmission on the available time-frequency resource in the second BWP acquired by the third detection module.

In an embodiment of the disclosure, the apparatus may further include a fourth detection module 1411, a fifth detection module 1412 and a third transmission module 1413.

The fourth detection module 1411 is configured to, before the terminal selects the second BWP, detect an available time-frequency resource on each of pre-stored BWPs to acquire the available time-frequency resource in the BWP. The pre-stored BWPs include the second BWP.

The fifth detection module 1412 is configured to, after the terminal switches from the first BWP to the second BWP, detect an available time-frequency resource on the second BWP again to acquire the available time-frequency resource.

The third transmission module 1413 is configured to perform data transmission on the available time-frequency resource acquired again by the fifth detection module 1412.

In an embodiment of the disclosure, the apparatus may further include a second obtaining module 1414 and a second selection module 1415.

The second obtaining module 1414 is configured to obtain at least one pre-configured BWP set.

The second selection module 1415 is configured to select a BWP set from the at least one BWP set obtained by the second obtaining module 1414, the BWP set including at least two BWPs; and select the first BWP from the selected BWP set.

In an embodiment of the disclosure, the second obtaining module 1414 may be further configured to receive at least one BWP set broadcast by an access network device, the terminal being located within a coverage of the access network device.

In an embodiment of the disclosure, the second obtaining module 1414 may be further configured to, responsive to there being at least one BWP set pre-stored in the terminal, read the at least one pre-stored BWP set.

In an embodiment of the disclosure, the second selection module 1415 may be further configured to: receive configuration indication from the access network device, the configuration indication indicating a BWP set in the at least one BWP set, and the terminal being located within the coverage of the access network device; and select the BWP set indicated by the configuration indication.

In an embodiment of the disclosure, the second selection module 1415 may be further configured to: obtain a selection rule, and select the BWP set from the at least one BWP set according to the selection rule.

In an embodiment of the disclosure, the second selection module 1415 may be further configured to: obtain present communication status information; determine configuration information of a BWP to be selected based on the communication status information, the configuration information including at least one of: a bandwidth, a subcarrier spacing, a type of a CP or a pilot configuration; and search for a BWP matching the configuration information from the BWP set, and determine the BWP as the first BWP.

According to the apparatus for resource switching provided in the disclosure, responsive to determining that it is necessary to switch the first BWP presently used, the terminal selects the second BWP among the at least two pre-configured BWPs, and switches from the first BWP to the second BWP. In this way, the terminal may switch the BWP by itself, without the need for the access network device to specify the BWP for the terminal. Therefore, the BWP may be introduced into the communication systems supporting the large bandwidth such as the D2D communication system, and the power consumption of the terminal is saved in these communication systems. In addition, a quality of communication of the terminal may be ensured since the BWP may be switched timely.

After switching to the second BWP, the terminal may perform data transmission only on the available time-frequency resource in the second BWP. Therefore, the terminal may detect the available time-frequency resource on the second BWP after switching to the second BWP. In this way, it is possible to avoid the problem of the higher power consumption of the terminal caused by the fact that if the available time-frequency resource detection is performed before switching to the second BWP, it is necessary to detect the available time-frequency resources on all of the BWPs since the BWP to be switched to is unknown. Therefore, the power consumption of the terminal may be saved.

The terminal may use the previously detected available time-frequency resource for data transmission after switching to the second BWP, without the need to detect the available time-frequency resource on the second BWP again. Therefore, the efficiency of data transmission may be improved.

Since the terminal may detect the available time-frequency resource again after the terminal switches to the second BWP, the problem of transmission failure when the terminal uses the previously detected available time-frequency resource for data transmission, caused by the fact that the available time-frequency resource is occupied by other terminals during the switching, may be avoided. Therefore, the success rate of data transmission may be improved.

Figure 16:
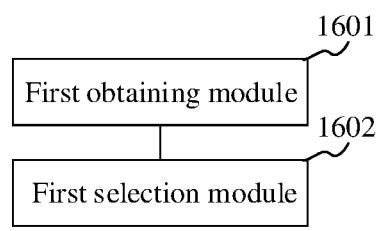
FIG. 16 is a block diagram illustrating an apparatus for resource configuration according to an exemplary embodiment.

FIG. 16 is a block diagram illustrating an apparatus for resource configuration according to an exemplary embodiment. The apparatus for resource configuration is applied to a terminal. As illustrated in FIG. 16, the apparatus for resource configuration includes a first obtaining module 1601 and a first selection module 1602.

The first obtaining module 1601 is configured to obtain at least one pre-configured BWP set. Each of the at least one BWP set includes at least one BWP.

The first selection module 1602 is configured to select a BWP set from the at least one BWP set obtained by the first obtaining module 1601, and select a first BWP from the selected BWP set.

Figure 17:
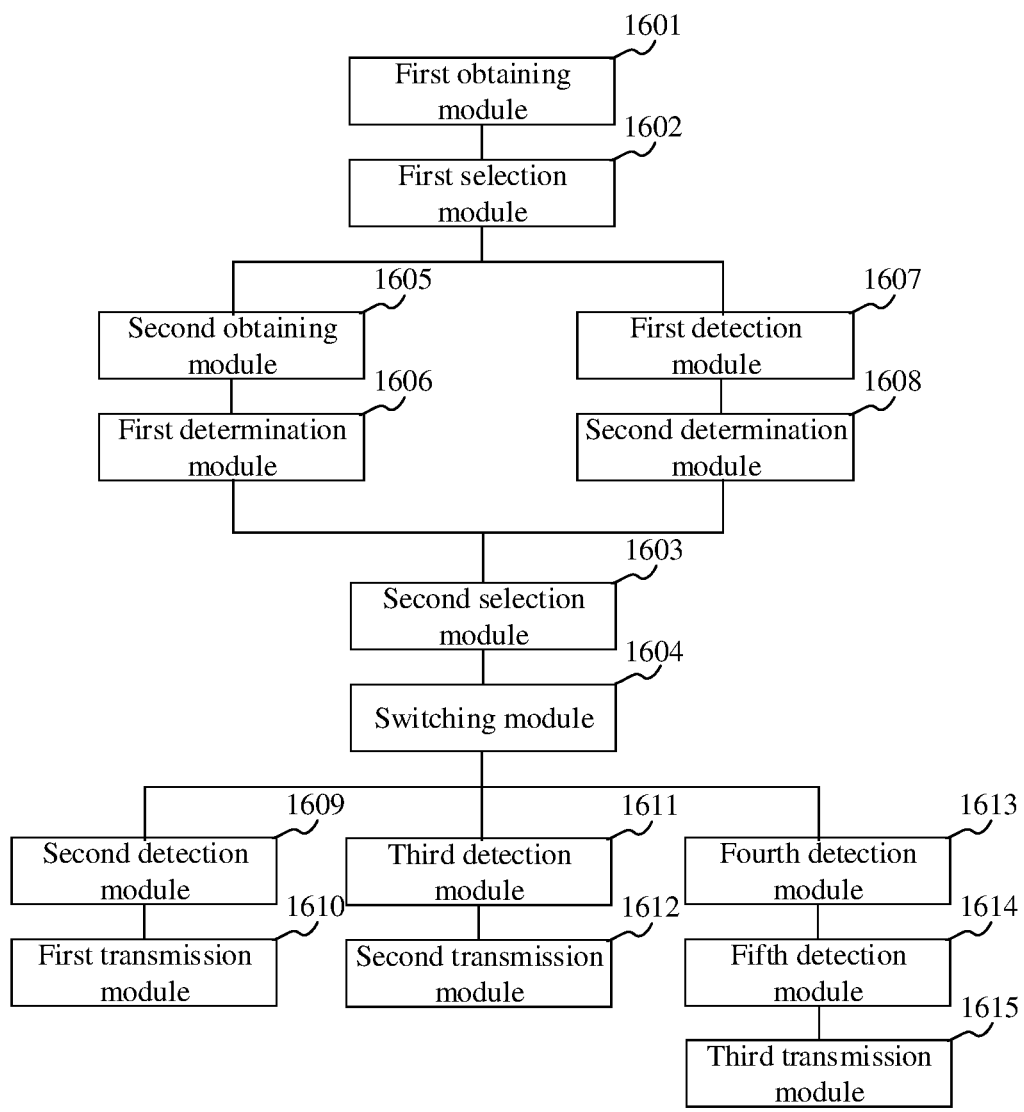
FIG. 17 is a block diagram illustrating an apparatus for resource configuration according to an exemplary embodiment.

Referring to FIG. 17, in an embodiment of the disclosure, the first obtaining module 1601 may be further configured to receive at least one BWP set broadcast by an access network device, the terminal being located within a coverage of the access network device.

In an embodiment of the disclosure, the first obtaining module 1601 may be further configured to, responsive to there being at least one BWP set pre-stored in the terminal, read the at least one pre-stored BWP set.

In an embodiment of the disclosure, the first selection module 1602 may be further configured to: receive configuration indication from the access network device, the configuration indication indicating a BWP set in the at least one BWP set, and the terminal being located within the coverage of the access network device; and select the BWP set indicated by the configuration indication.

In an embodiment of the disclosure, the first selection module 1602 may be further configured to: obtain a selection rule, and select the BWP set from the at least one BWP set according to the selection rule.

In an embodiment of the disclosure, the first selection module 1602 may be further configured to: obtain present communication status information; determine configuration information of a BWP to be selected based on the communication status information, the configuration information including at least one of: a bandwidth, a subcarrier spacing, a type of a CP or a pilot configuration; and search for a BWP matching the configuration information from the BWP set, and determine the BWP as the first BWP.

In an embodiment of the disclosure, the apparatus may further include a second selection module 1603 and a switching module 1604.

The second selection module 1603 is configured to, when the BWP set selected by the terminal includes at least two BWPs, and it is determined that it is necessary to switch the first BWP presently used, select a second BWP from the BWP set.

The switching module 1604 is configured to switch from the first BWP to the second BWP selected by the second selection module 1603.

In an embodiment of the disclosure, the apparatus may further include a second obtaining module 1605 and a first determination module 1606.

The second obtaining module 1605 is configured to obtain present communication status information.

The first determination module 1606 is configured to, responsive to the communication status information not matching the first BWP presently used by the terminal, determine that it is necessary to switch the first BWP presently used.

In an embodiment of the disclosure, the second selection module 1603 may be further configured to: determine configuration information of a BWP to be switched to based on the communication status information, the configuration information including at least one of: a bandwidth, a subcarrier spacing, a type of a CP or a pilot configuration; and search for a BWP matching the configuration information from the BWP set, and determine the BWP as the second BWP.

In an embodiment of the disclosure, the apparatus may further include a first detection module 1607 and a second determination module 1608.

The first detection module 1607 is configured to detect an available time-frequency resource on the first BWP.

The second determination module 1608 is configured to, responsive to there being no available time-frequency resource on the first BWP, determine that it is necessary to switch the first BWP presently used.

In an embodiment of the disclosure, the apparatus may further include a second detection module 1609 and a first transmission module 1610.

The second detection module 1609 is configured to, after the terminal switches from the first BWP to the second BWP, detect an available time-frequency resource on the second BWP to acquire the available time-frequency resource.

The first transmission module 1610 is configured to perform data transmission on the available time-frequency resource acquired by the second detection module 1609.

In an embodiment of the disclosure, the apparatus may further include a third detection module 1611 and a second transmission module 1612.

The third detection module 1611 is configured to, before the terminal selects the second BWP, detect an available time-frequency resource on each of pre-stored BWPs to acquire the available time-frequency resource in the BWP. The pre-stored BWPs include the second BWP.

The second transmission module 1612 is configured to, after the terminal switches from the first BWP to the second BWP, perform data transmission on the available time-frequency resource in the second BWP acquired by the third detection module 1611.

In an embodiment of the disclosure, the apparatus may further include a fourth detection module 1613, a fifth detection module 1614 and a third transmission module 1615.

The fourth detection module 1613 is configured to, before the terminal selects the second BWP, detect an available time-frequency resource on each of pre-stored BWPs to acquire the available time-frequency resource in the BWP. The pre-stored BWPs include the second BWP.

The fifth detection module 1614 is configured to, after the terminal switches from the first BWP to the second BWP, detect an available time-frequency resource on the second BWP again to acquire the available time-frequency resource.

The third transmission module 1615 is configured to perform data transmission on the available time-frequency resource acquired again by the fifth detection module 1614.

According to the apparatus for resource configuration provided in the disclosure, after the BWP set is selected from the at least one pre-configured BWP set, the terminal may select the BWP from the BWP set. In this way, the terminal may select the BWP by itself, without the need for the access network device to specify the BWP for the terminal. Therefore, the BWP may be introduced into the communication systems supporting the large bandwidth such as the D2D communication system, and the power consumption of the terminal is saved in these communication systems. In addition, a quality of communication of the terminal may be ensured since the BWP may be switched timely.

Since the terminal selects a BWP from a BWP set, instead of selecting a BWP from all of the BWPs, the computing resources occupied for selecting the BWP may be saved, thereby the power consumption of the terminal may be saved.

Since the BWP set is specified by the access network device for the terminal rather than selected by the terminal, the power consumption of the terminal when selecting the BWP set is saved.

Since the at least one pre-configured BWP set is broadcast by the access network device to the terminal rather than pre-stored in the terminal, the storage space of the terminal may be saved.

Figure 18:
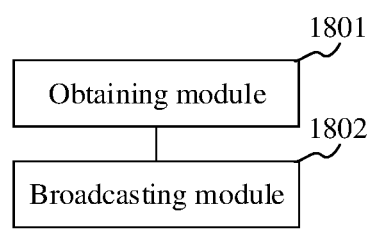
FIG. 18 is a block diagram illustrating an apparatus for resource configuration according to an exemplary embodiment.

FIG. 18 is a block diagram illustrating an apparatus for resource configuration according to an exemplary embodiment. The apparatus for resource configuration is applied to an access network device. As illustrated in FIG. 18, the apparatus for resource configuration includes an obtaining module 1801 and a broadcasting module 1802.

The obtaining module 1801 is configured to obtain at least one BWP set configured for a terminal. Each of the at least one BWP set includes at least one BWP, and the terminal is located within a coverage of the access network device.

The broadcasting module 1802 is configured to broadcast the at least one BWP set obtained by the obtaining module 1801 to the terminal, to enable the terminal to select a BWP set from the at least one BWP set and to select a first BWP from the selected BWP set.

Figure 19:
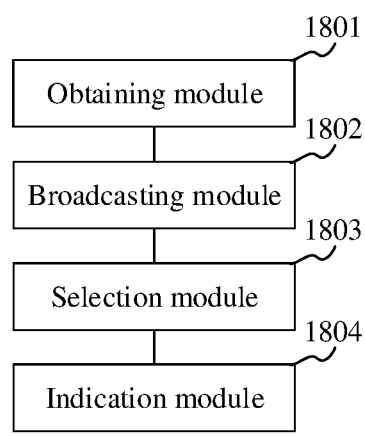
FIG. 19 is a block diagram illustrating an apparatus for resource configuration according to an exemplary embodiment.

Referring to FIG. 19, in an embodiment of the disclosure, the apparatus may further include a selection module 1803 and an indication module 1804.

The selection module 1803 is configured to select a BWP set from the at least one BWP set.

The indication module 1804 is configured to send configuration indication to the terminal. The configuration indication indicates the BWP set in the at least one BWP set.

According to the apparatus for resource configuration provided in the disclosure, the access network device broadcasts the at least one BWP set to the terminal, and the terminal selects the BWP set from the at least one BWP set. After that, the terminal selects a BWP from the selected BWP set. In this way, the terminal may select the BWP by itself, without the need for the access network device to specify the BWP for the terminal. Therefore, the BWP may be introduced into the communication systems supporting the large bandwidth such as the D2D communication system, and the power consumption of the terminal is saved in these communication systems.

Since the at least one pre-configured BWP set is broadcast by the access network device to the terminal rather than pre-stored in the terminal, the storage space of the terminal is saved.

Figure 20:
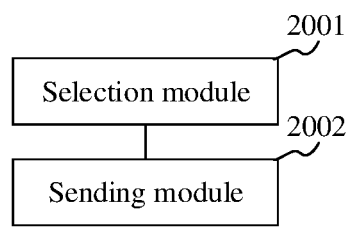
FIG. 20 is a block diagram illustrating an apparatus for resource configuration according to an exemplary embodiment.

FIG. 20 is a block diagram illustrating an apparatus for resource configuration according to an exemplary embodiment. The apparatus for resource configuration is applied to an access network device. As illustrated in FIG. 20, the apparatus for resource configuration includes a selection module 2001 and a sending module 2002.

The selection module 2001 is configured to select a BWP set from at least one BWP set configured for a terminal. Each of the at least one BWP set includes at least one BWP, and the terminal is located within a coverage of the access network device.

The sending module 2002 is configured to send configuration indication to the terminal. The configuration indication indicates the BWP set in the at least one BWP set, to enable the terminal to select a first BWP from the BWP set.

According to the apparatus for resource configuration provided in the disclosure, the access network device specifies the BWP set to the terminal, and the terminal selects the BWP from the BWP set. In this way, the terminal may select the BWP by itself, without the need for the access network device to specify the BWP for the terminal. Therefore, the BWP may be introduced into the communication systems supporting the large bandwidth such as the D2D communication system, and the power consumption of the terminal is saved in these communication systems.

Since the BWP set is specified by the access network device for the terminal rather than selected by the terminal, the power consumption of the terminal when selecting the BWP set may be saved.

A terminal is provided in an exemplary embodiment of the disclosure, which is able to implement the method for resource switching provided in the disclosure. The terminal includes a processor and a memory for storing instructions executable by the processor.

The processor is configured to: responsive to a terminal determining that it is necessary to switch a first BWP presently used, select a second BWP among at least two pre-configured BWPs; and switch from the first BWP to the second BWP.

A terminal is provided in an exemplary embodiment of the disclosure, which is able to implement the method for resource configuration provided in the disclosure. The terminal includes a processor and a memory for storing instructions executable by the processor.

The processor is configured to: obtain at least one preconfigured BWP set, each of the at least one BWP set including at least one BWP; select a BWP set from the at least one BWP set; and select a first BWP from the selected BWP set.

An access network device is provided in an exemplary embodiment of the disclosure, which is able to implement the method for resource configuration provided in the disclosure. The access network device includes a processor and a memory for storing instructions executable by the processor.

The processor is configured to: obtain at least one BWP set configured for a terminal, each of the at least one BWP set including at least one BWP, and the terminal being located within a coverage of the access network device; and broadcast the at least one BWP set to the terminal, to enable the terminal to select a BWP set from the at least one BWP set and to select a first BWP from the selected BWP set.

An access network device is provided in an exemplary embodiment of the disclosure, which is able to implement the method for resource configuration provided in the disclosure. The access network device includes a processor and a memory for storing instructions executable by the processor.

The processor is configured to: select a BWP set from at least one BWP set configured for a terminal, each of the at least one BWP set including at least one BWP, and the terminal being located within a coverage of the access network device; and send configuration indication to the terminal, the configuration indication indicating the BWP set in the at least one BWP set, to enable the terminal to select a first BWP from the BWP set.

Figure 21:
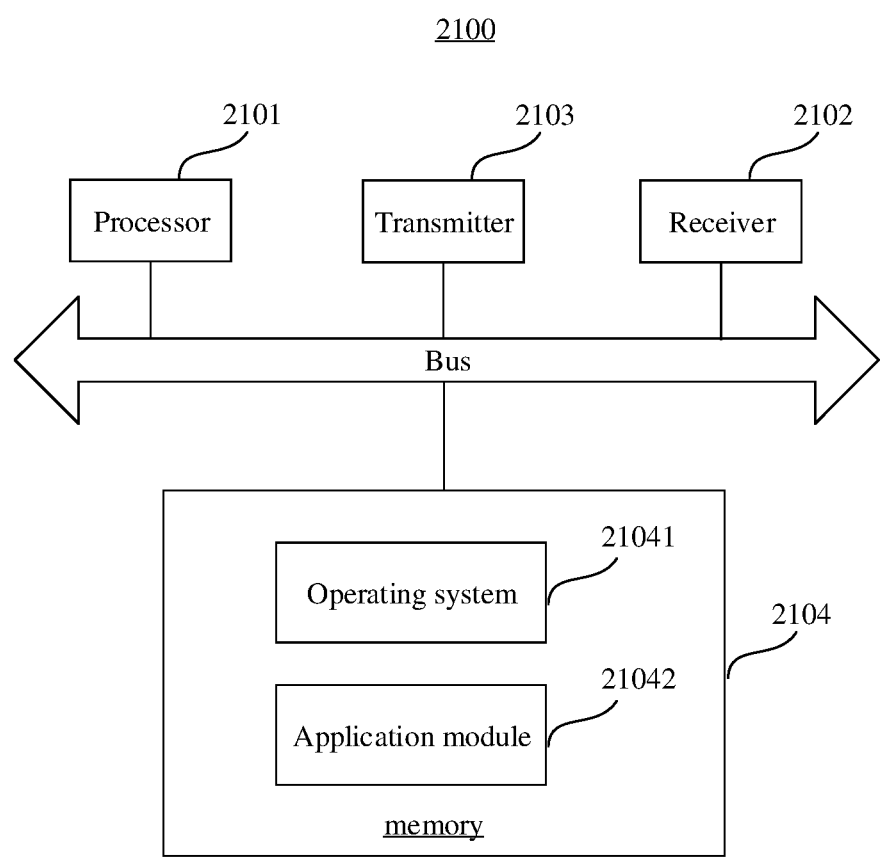
FIG. 21 is a block diagram illustrating an electronic device according to an exemplary embodiment.

FIG. 21 is a block diagram illustrating an electronic device according to an exemplary embodiment. For example, the electronic device 2100 may be a terminal or an access network device. As illustrated in FIG. 21, the electronic device 2100 may include a processor 2101, a receiver 2102, a transmitter 2103 and a memory 2104. The receiver 2102, the transmitter 2103 and the memory 2104 are respectively connected to the processor 2101 via a bus.

The processor 2101 includes one or more processing cores. The processor 2101 runs software programs and modules to execute the method performed by the terminal in the methods for resource switching provided in the embodiments of the disclosure. Or, the processor 2101 runs software programs and modules to execute the method performed by the terminal in the methods for resource configuration provided in the embodiments of the disclosure. The memory 2104 may be configured to store the software programs and modules. Specifically, the memory 2104 may store an operating system 21041 and an application module 21042 required by at least one function. The receiver 2102 is configured to receive communication data from other devices, and the transmitter 2103 is configured to send communication data to other devices.

A computer readable storage medium having stored therein at least one instruction, at least one segment of a program, a code set or an instruction set is provided in an exemplary embodiment of the disclosure. The at least one instruction, the at least one segment of a program, the code set or the instruction set is loaded and executed by the processor to execute the method for resource switching and the method for resource configuration described above.

After considering the specification and implementing the disclosure disclosed herein, a person skilled in the art may easily conceive of other implementations of the disclosure. This application intends to cover any variations, uses or adaptive changes of the disclosure, and these variations, uses or adaptive changes comply with the general principle of the disclosure and include the common knowledge or common technical means in the technical field that is not disclosed in the disclosure. The specification and the embodiments are only considered to be exemplary, and the actual scope and spirit of the disclosure are indicated in the appended claims.

It should be understood that the disclosure is not limited to the precise structures that are described above and shown in the accompanying drawings, and various modifications and changes can be made without departing from the scope of the disclosure. The scope of disclosure is defined by only the appended claims.

What is claimed is:
1. A method for resource switching, comprising:
obtaining, by a terminal, present communication status information;
responsive to the present communication status information not matching a first bandwidth part (BWP) presently used by the terminal, determining, by the terminal, that it is necessary to switch the first BWP presently used;
responsive to the terminal determining that it is necessary to switch the first BWP presently used, selecting, by the terminal, a second BWP among at least two preconfigured BWPs, comprising:
determining, by the terminal, configuration information of a BWP to be switched to based on the present communication status information, wherein the configuration information comprises at least one of: a bandwidth, a subcarrier spacing, a type of a cyclic prefix (CP) or a pilot configuration; and
searching, by the terminal, for a BWP matching the configuration information among the at least two pre-configured BWPs, and determining the BWP as the second BWP; and
switching, by the terminal, from the first BWP to the second BWP.
2. The method of claim 1, further comprising:
detecting, by the terminal, an available time-frequency resource on the first BWP; and
responsive to there being no available time-frequency resource on the first BWP, determining, by the terminal, that it is necessary to switch the first BWP presently used.
3. The method of claim 1, further comprising:
after the terminal switches from the first BWP to the second BWP, detecting, by the terminal, an available time-frequency resource on the second BWP to acquire the available time-frequency resource; and
performing, by the terminal, data transmission on the available time-frequency resource.
4. The method of claim 1, further comprising:
before the terminal selects the second BWP, detecting, by the terminal, an available time-frequency resource on each of pre-stored BWPs to acquire the available time-frequency resource in each of the pre-stored BWPs, wherein the pre-stored BWPs comprise the second BWP; and after the terminal switches from the first BWP to the second BWP, performing, by the terminal, data transmission on the available time-frequency resource in the second BWP.

5. The method of claim 1, further comprising:
before the terminal selects the second BWP, detecting, by the terminal, an available time-frequency resource on each of pre-stored BWPs to acquire the available time-frequency resource in each of the pre-stored BWPs, wherein the pre-stored BWPs comprise the second BWP;
after the terminal switches from the first BWP to the second BWP, detecting, by the terminal, a second available time-frequency resource on the second BWP again to acquire the second available time-frequency resource; and
performing, by the terminal, data transmission on the second available time-frequency resource.

6. The method of claim 1, further comprising:
obtaining, by the terminal, at least one pre-configured BWP set;
selecting, by the terminal, a BWP set from the at least one pre-configured BWP set, wherein the BWP set comprises at least two BWPs; and
selecting, by the terminal, the first BWP from the BWP set.

7. The method of claim 6, wherein obtaining, by the terminal, the at least one pre-configured BWP set comprises:
receiving, by the terminal, the at least one pre-configured BWP set broadcast by an access network device, wherein the terminal is located within a coverage of the access network device.

8. The method of claim 7, wherein selecting, by the terminal, the BWP set from the at least one pre-configured BWP set comprises:
receiving, by the terminal, configuration indication from the access network device, wherein the configuration indication indicates the BWP set in the at least one pre-configured BWP set; and selecting, by the terminal, the BWP set indicated by the configuration indication;
or,
obtaining, by the terminal, a selection rule, and selecting the BWP set from the at least one pre-configured BWP set according to the selection rule;
wherein selecting, by the terminal, the first BWP from the BWP set comprises:
determining, by the terminal, second configuration information of a BWP to be selected based on the present communication status information, wherein the second configuration information comprises at least one of: a second bandwidth, a second subcarrier spacing, a second type of the CP or a second pilot configuration; and
searching, by the terminal, for a BWP matching the second configuration information from the BWP set, and determining the BWP as the first BWP.

9. The method of claim 6, wherein obtaining, by the terminal, the at least one pre-configured BWP set comprises:
responsive to there being at least one BWP set pre-stored in the terminal, reading, by the terminal, the at least one BWP set.

10. A method for resource configuration, comprising:
obtaining, by a terminal, at least one pre-configured bandwidth part (BWP) set, wherein each of the at least one pre-configured BWP set comprises at least one BWP;
selecting, by the terminal, a BWP set from the at least one pre-configured BWP set; and
selecting, by the terminal, a first BWP from the BWP set, comprising:
obtaining, by the terminal, present communication status information;
determining, by the terminal, configuration information of a BWP to be selected based on the present communication status information, wherein the configuration information comprises at least one of: a bandwidth, a subcarrier spacing, a type of a cyclic prefix (CP) or a pilot configuration; and
searching, by the terminal, for a BWP matching the configuration information from the BWP set, and determining the BWP as the first BWP;
wherein the method further comprises:
when the BWP set selected by the terminal comprises at least two BWPs, and it is determined that it is necessary to switch the first BWP presently used, selecting, by the terminal, a second BWP from the BWP set; and switching, by the terminal, from the first BWP to the second BWP.

11. The method of claim 10, wherein obtaining, by the terminal, the at least one pre-configured BWP set comprises:
receiving, by the terminal, the at least one pre-configured BWP set broadcast by an access network device, wherein the terminal is located within a coverage of the access network device;
or,
responsive to there being at least one BWP set pre-stored in the terminal, reading, by the terminal, the at least one BWP set.

12. The method of claim 11, wherein selecting, by the terminal, the BWP set from the at least one pre-configured BWP set comprises:
receiving, by the terminal, configuration indication from the access network device, wherein the configuration indication indicates the BWP set in the at least one pre-configured BWP set; and selecting, by the terminal, the BWP set indicated by the configuration indication;
or,
obtaining, by the terminal, a selection rule, and selecting the BWP set from the at least one pre-configured BWP set according to the selection rule.

13. The method of claim 10, further comprising:
responsive to the present communication status information not matching the first BWP presently used by the terminal, determining, by the terminal, that it is necessary to switch the first BWP presently used.

14. The method of claim 10, wherein selecting, by the terminal, the second BWP from the BWP set comprises:
determining, by the terminal, second configuration information of a BWP to be switched to based on the present communication status information, wherein the second configuration information comprises at least one of: a second bandwidth, a second subcarrier spacing, a second type of the CP or a second pilot configuration; and
searching, by the terminal, for a BWP matching the second configuration information from the BWP set, and determining the BWP as the second BWP.

15. The method of claim 10, further comprising:
detecting, by the terminal, an available time-frequency resource on the first BWP; and
responsive to there being no available time-frequency resource on the first BWP, determining, by the terminal, that it is necessary to switch the first BWP presently used.

16. The method of claim 10, further comprising:
after the terminal switches from the first BWP to the second BWP, detecting, by the terminal, an available time-frequency resource on the second BWP to acquire the available time-frequency resource; and performing, by the terminal, data transmission on the available time-frequency resource;

or, before the terminal selects the second BWP, detecting, by the terminal, an available time-frequency resource on each of pre-stored BWPs to acquire the available time-frequency resource in each of the pre-stored BWPs, wherein the pre-stored BWPs comprise the second BWP; and after the terminal switches from the first BWP to the second BWP, performing, by the terminal, data transmission on the available time-frequency resource in the second BWP;

or, before the terminal selects the second BWP, detecting, by the terminal, an available time-frequency resource on each of pre-stored BWPs to acquire the available time-frequency resource in each of the pre-stored BWPs, wherein the pre-stored BWPs comprise the second BWP; after the terminal switches from the first BWP to the second BWP, detecting, by the terminal, a second available time-frequency resource on the second BWP to acquire the second available time-frequency resource; and performing, by the terminal, data transmission on the second available time-frequency resource.

17. A method for resource configuration, comprising:
selecting, by an access network device, a bandwidth part (BWP) set from at least one BWP set configured for a terminal, wherein each of the at least one BWP set comprises at least one BWP, and the terminal is located within a coverage of the access network device; and sending, by the access network device, configuration indication to the terminal, wherein the configuration indication indicates the BWP set in the at least one BWP set, to enable the terminal to:
 obtain present communication status information; determine configuration information of a BWP to be selected based on the present communication status information, wherein the configuration information comprises at least one of: a bandwidth, a subcarrier spacing, a type of a cyclic prefix (CP) or a pilot configuration; search for a BWP matching the configuration information from the BWP set; and determine the BWP as a first BWP;
 when the BWP set comprises at least two BWPs, and it is determined that it is necessary to switch the first BWP presently used, select a second BWP from the BWP set; and switch from the first BWP to the second BWP.

* * * * *